United States Patent [19]
Tsuruta

[11] Patent Number: 6,145,282
[45] Date of Patent: Nov. 14, 2000

[54] FORMING, FILLING AND SEALING MACHINE FOR STANDING POUCH

[75] Inventor: Orihiro Tsuruta, Gunma, Japan

[73] Assignee: Orihiro Engineering Co., Ltd., Takasaki, Japan

[21] Appl. No.: 09/192,324

[22] Filed: Nov. 16, 1998

[30] Foreign Application Priority Data

| Nov. 20, 1997 | [JP] | Japan | .................................. 9-319856 |
| Jun. 8, 1998 | [JP] | Japan | ................................. 10-159430 |
| Aug. 20, 1998 | [JP] | Japan | ................................. 10-234205 |

[51] Int. Cl.$^7$ ...................................................... B65B 9/20
[52] U.S. Cl. ............................................. 53/551; 53/552
[58] Field of Search ............................. 53/562, 567, 551, 53/552

[56] References Cited

U.S. PATENT DOCUMENTS

| 2,718,105 | 9/1955 | Ferguson et al. | 53/562 |
| 2,978,853 | 4/1961 | Price | 53/552 |
| 3,552,081 | 1/1971 | Leasure | 53/552 |
| 3,785,112 | 1/1974 | Leasure et al. | 53/551 |
| 3,935,993 | 2/1976 | Doyen et al. | |
| 4,009,551 | 3/1977 | Greenwalt et al. | 53/552 |
| 5,241,804 | 9/1993 | Tsuruta et al. | 53/551 |
| 5,463,851 | 11/1995 | Nagai | 53/552 |
| 5,826,401 | 10/1998 | Bois | 53/551 |

FOREIGN PATENT DOCUMENTS

| 0 792 801 | 9/1997 | European Pat. Off. . |
| 2 102 442 | 4/1972 | France . |
| 2 600 304 | 12/1987 | France . |
| 7-172403 | 7/1995 | Japan . |
| 2 298 850 | 9/1996 | United Kingdom . |
| WO 89/00949 | 2/1989 | WIPO . |

Primary Examiner—John Sipos
Attorney, Agent, or Firm—Oblon, Spivak, McClelland, Maier & Neustadt, P.C.

[57] ABSTRACT

A forming, filling and sealing machine comprises three sealing mechanisms for heat sealing a film, a folding mechanism for inwardly folding the width direction middle part of the film along the longitudinal direction of the film, and an injection pipe for injecting in filling materials. A first sealing mechanism heat seals a long sheet film to be carried downwards with both side ends overlapped with each other, the heat sealing being applied to the overlapped both side ends along the longitudinal direction of the film. A second sealing mechanism heat seals at least the top of two ridge portions formed by the folding mechanism in the film along the longitudinal direction of the film. A third sealing mechanism is disposed below the injection pipe for horizontally heat sealing the film and cutting the heat sealed portion.

11 Claims, 30 Drawing Sheets

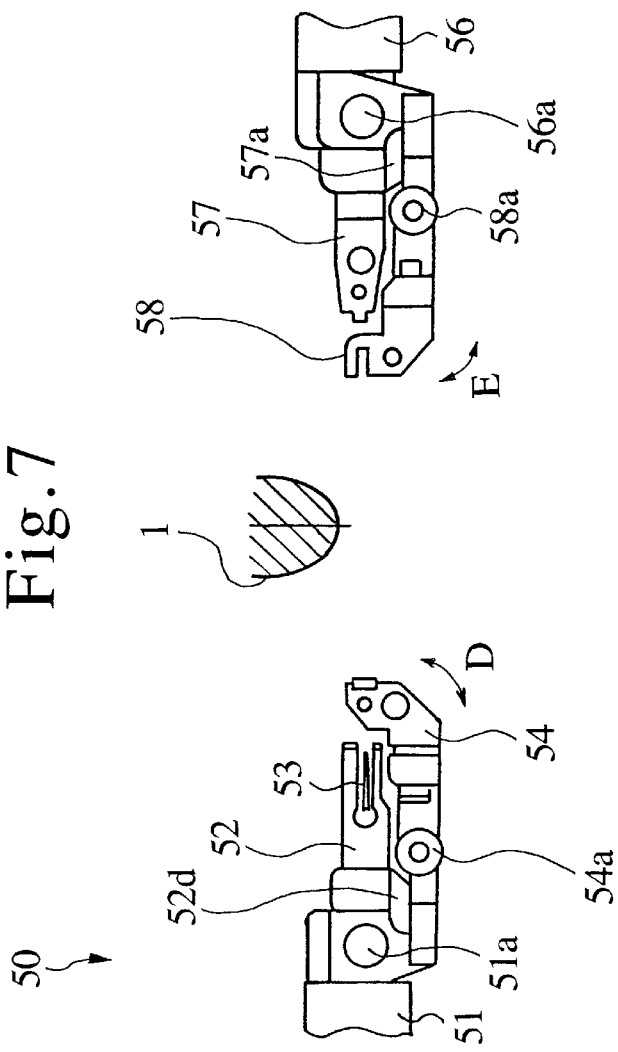
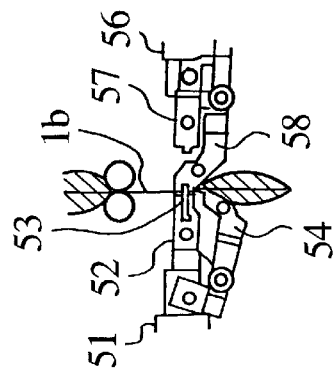
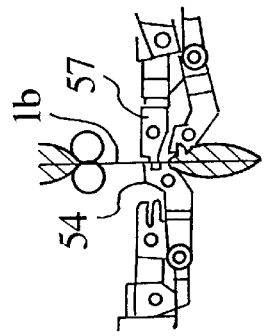
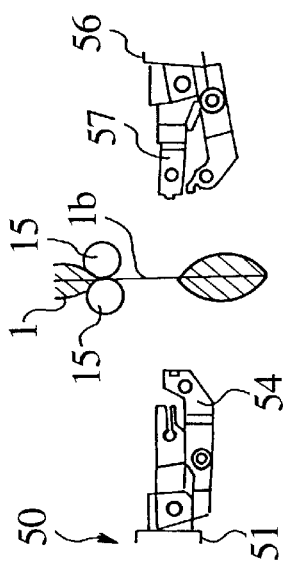

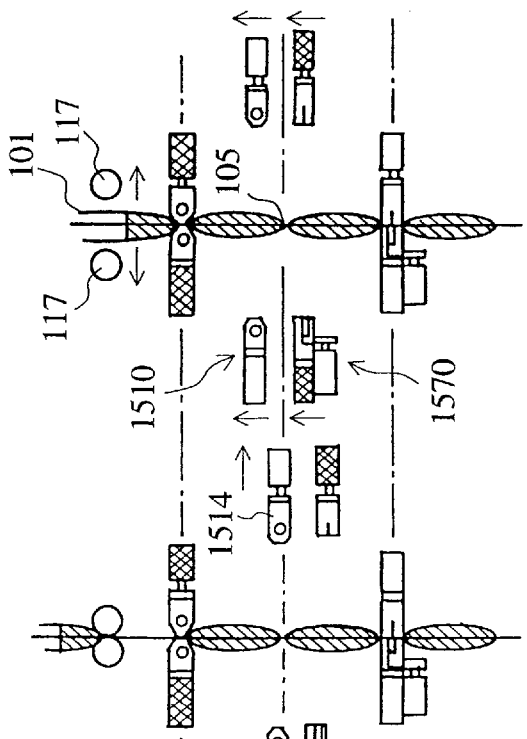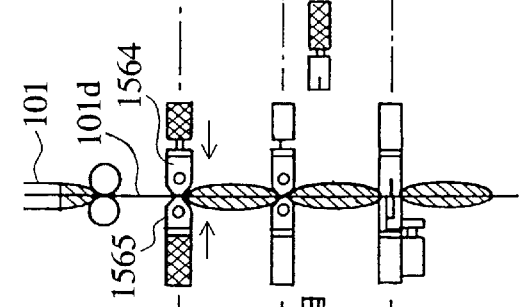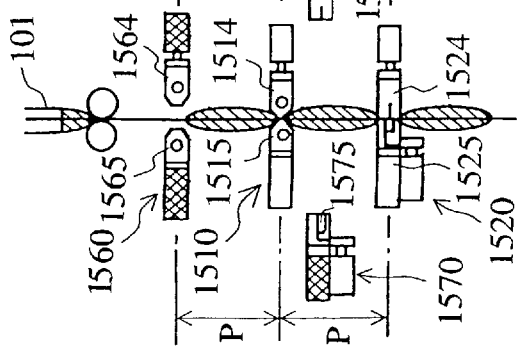

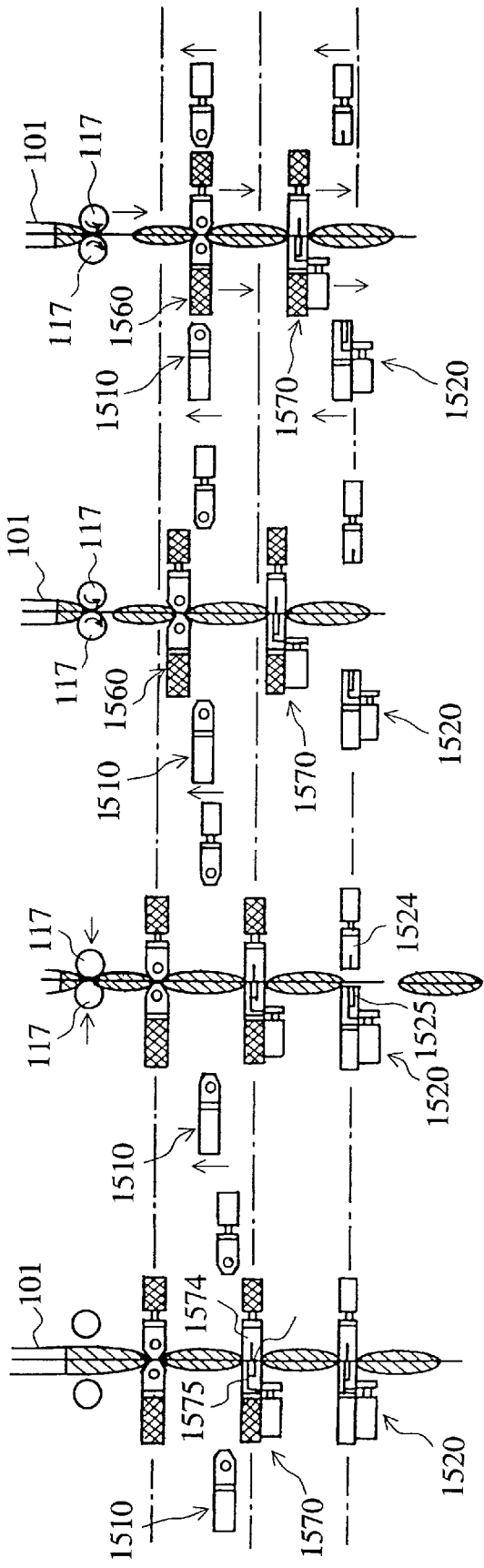

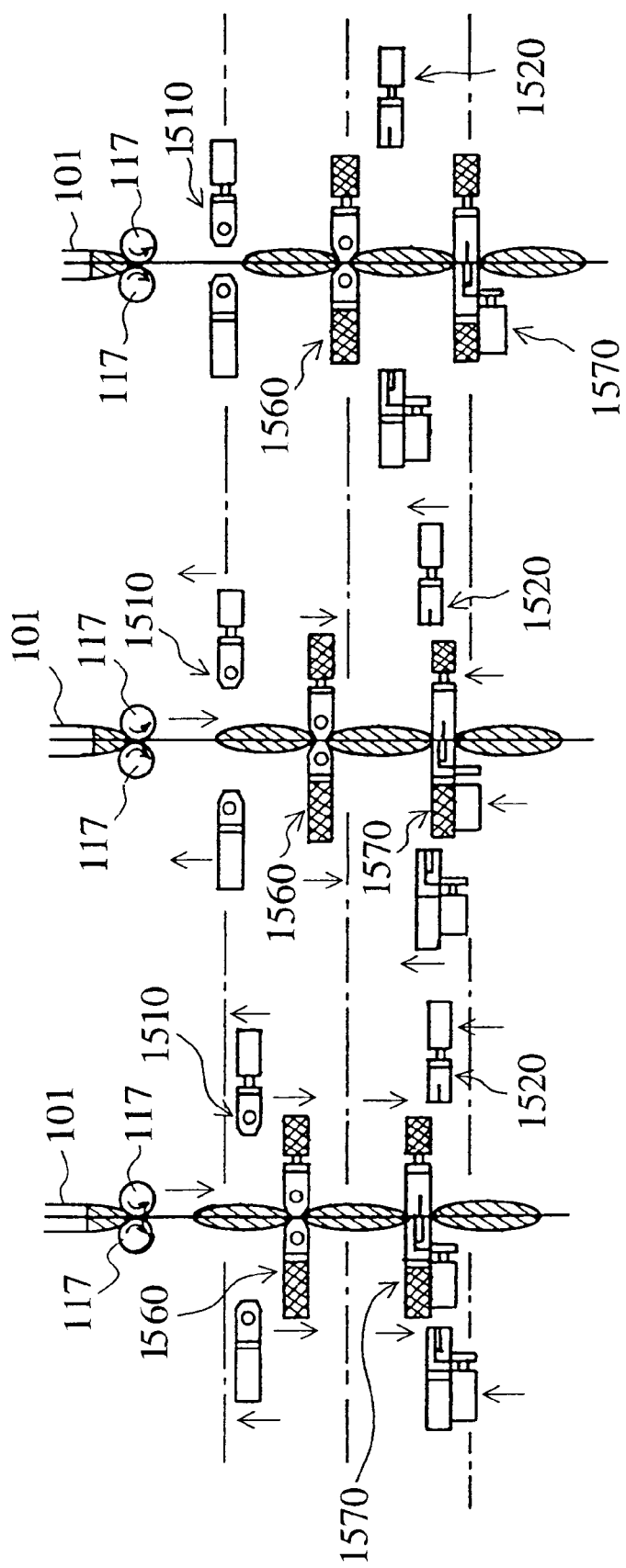

FORMING, FILLING AND SEALING MACHINE FOR STANDING POUCH

BACKGROUND OF THE INVENTION

1. Field of the Invention

The present invention relates to a forming, filling and sealing machine for concurrently forming a standing pouch with a sheet film and filling the pouch with a filling material while carrying the sheet film downward.

2. Description of the Related Art

As a filling and sealing machine for forming a bag with a sheet film and concurrently filling a liquefied or paste filling material with the bag, a vertical type forming, filling and sealing machine has hitherto been known. A vertical type forming, filling and sealing machine comprises a film forming guide for forming the sheet film into a tubular shape, a vertical sealing mechanism for heat sealing an edge of the film into a tubular shape to produce a tubular film, a pair of squeezing rollers for dividing the filling material introduced into the tubular film and downwardly carrying the tubular film with the divided product, and a end sealing mechanism for horizontally heat sealing the unfilled part produced in the tubular film by the rotation of the squeezing rollers and cutting off the sealed part.

As a machine capable of performing high speed heat sealing and obtaining increased seal strength, Japanese Patent Laid-open No. 172403/95 discloses a vertical type forming, filling and sealing machine having a end sealing mechanism which includes a heater bar for heat sealing the unfilled part and a cooling bar for cooling the heat sealed portion. The heater bar and the cooling bar have the ability to successively press the same portion when the film feed is in a stopped state.

On the other hand, there is a package type of standing pouch. As this standing pouch can be displayed in a shop in a self-supported state, it has been widely used recently as a package form replacing plastic cases, bottles or cans.

Making of standing pouches and filling of filling materials are generally performed in separate processes. Specifically, bags are prepared in advance wherein a bottom folded into a W-form and both sides are heat sealed to keep only the top open. Next in the filling process, the prepared bags are taken out one by one, and filled while being conveyed in a horizontal direction. After the filling product has been introduced into the bags from the opening, the top portion is hermetically closed thorough heat sealing.

However, bag making and filling in separate processes fails to increase productivity. A forming, filling and sealing machine for standing pouches has been developed for bag making and filling successively, the machine folding a sheet film in half, conveying the folded film in the horizontal direction, heat sealing the bottom and both sides, introducing the filling material from the top opening of the bag, after cutting the bags one by one, and heat sealing the top of the bag.

The above forming, filling and sealing machine can increase the productivity for standing pouches. However, a new problem is encountered that a large area is required for installation of the machine because the film is carried horizontally in the machine.

Further, there is a risk that dust may enter the bag because the filling material is introduced into the bag from the top opening while the bag is being carried horizontally. Moreover, since the top opening of the bag is heat sealed, it is very difficult to heat seal the bag without air being introduced into the bag. Therefore, in the case of filler products which easily oxidize or rot, such as foods, it is impossible to maintain product quality. Further, if the filling material, such as detergent, produces bubbles when it is introduced into the bag, bubbles may flow out of the opening of the bag during the filling process, thereby making the surface of the bag dirty or bubbles may stick to the portion to be heat sealed, resulting in faulty sealing of the bag.

The vertical type forming, filling and sealing machine is effective in solving these problems. However, since the standing pouch has a thick bottom, how to fabricate this thick bottom is critical in producing a standing pouch by means of the vertical type forming, filling and sealing machine.

Further, although a conventional vertical type forming, filling and sealing machine disclosed in Japanese Patent Laid-open No. 172403/95 is advantageous in the heat sealing rate as well as in the seal strength in the case of producing a pillow type package, it still has plenty of improvement in the production of a standing pouch. Specifically, the bottoms of standing pouches require at a maximum the heat sealing of four layers of film. Reliable heat sealing of the four-layer portion requires a prolonged sealing time, resulting is a decrease in productivity.

SUMMARY OF THE INVENTION

It is an object of the present invention to provide a forming, filling and sealing machine for efficiently producing a standing pouch by making use of the merits of the conventional vertical type forming, filling and sealing machine by carrying out the bag making and filling operation as the film passes downwardly.

It is another object of the present invention to provide a forming, filling and sealing machine which can manufacture standing pouches at a high speed while assuring sufficient the time for heat sealing of the film without the decrease in productivity.

According to one aspect of the present invention, the forming, filling and sealing machine comprises a first sealing mechanism for heat sealing both side ends of a long sheet film carried downward with both side ends thereof overlapped with each other; a folding mechanism for forming two ridge portions in the film by inwardly folding the width direction center part of the film passes downward; and a second sealing mechanism for heat sealing at least the top of the ridge portions formed in the film by the folding mechanism.

The film is formed into a tubular shape by heat sealing the film by means of the first sealing mechanism. On the opposite side of the heat sealed portion prepared by the first sealing mechanism, two ridge portions are produced by the folding mechanism. Thereafter, at least the top of the ridge portions are heat sealed by the second sealing mechanism.

Filling materials are introduced inside the tubular film heat sealed by the first and second sealing mechanisms thorough an injection pipe. Then the film is heat sealed in the horizontal direction and cut off by a third sealing mechanism. In this manner, a standing pouch is produced, the bottom of which is formed at the position sealed by the second sealing mechanism.

According to a preferred embodiment of the present invention, the third sealing mechanism comprises a heater bar for heat sealing the film arranged reciprocally movable opposite to each other with the film between them and a cutter holding member for holding the cutter which cuts the film. The cutter holding member is provided with a heater bar receiving member which shifts to a position opposite the heater bar from the movement of the cutter holding member away from the film, and for cooling the position heated by the heater bar, the heater bar is provided with a cooling member which shifts to a position facing the cutter holding member from the movement of heater bar away from the film.

In addition, bumps may be provided in the second sealing mechanism for applying a spot heat seal to the ridge portions of the film in the vicinity of the portion which is heat sealed by the third sealing mechanism. According to the above process, a spot heat sealed portion is formed in the lower corner of the standing pouch, thereby reinforcing by the spot seales the side seal portion of the standing pouch at the part liable to be split off.

According to another aspect of the present invention, the forming, filling and sealing machine comprises a top sealing mechanism for heat sealing both side ends of the sheet film folded so that both side ends are coincident with each other, a folding mechanism for forming two ridge portions in the film by inwardly folding the width center part of the film, and a bottom sealing mechanism for heat sealing at least the top of the ridge portions formed in the film by the folding mechanism. Further, a pair of squeezing rollers are provided with the film heat sealed by the top sealing mechanism between them and arranged to reciprocally movable facing each other. The squeezing rollers rotate while pressing the film placed therebetween for carrying the film downward, thereby dividing the filling material supplied through the injection pipe.

Below the injection pipe, a end sealing apparatus having two sealing mechanisms and two cooling mechanisms located below the sealing mechanisms are provided. The sealing mechanisms and the cooling mechanisms can move independently in the perpendicular direction for sealing the film in the horizontal direction and for cooling the heat sealed portion while the film is being carried downward. With reference to the sealing mechanisms, while one of them is moving down along with the film and simultaneously heat sealing the film, the other, one which has moved down along with the film and simultaneous heat sealed the film in a previous operation, is moved upwards for the next heat sealing operation. With reference to the cooling mechanisms, while either one of them is moving downward along with the film concurrently cooling the heat sealed portion heat sealed by the other sealing mechanism in the previous operation, the other one moves upwards for cooling the portion heat sealed by either of the sealing mechanisms. In other words, while carrying the film downwardly, each heat sealing mechanism heat seals the film alternately, and each cooling mechanism alternately cools the portion heat sealed by the heat sealing mechanisms.

Therefore, the heat sealing operation by one sealing mechanism can be commenced immediately after or before the finish of the heat sealing operation by the other sealing mechanism. In addition, cooling by one cooling mechanism can be commenced immediately after the termination of the heat sealing operation of the other sealing mechanism. Accordingly, while ensuring the heat sealing time and the cooling time required for sure sealing of the film, productivity is not lowered.

The above other objects, features and advantages of the present invention will become apparent from the following description with reference to the accompanying drawings which illustrate examples of the present invention.

BRIEF DESCRIPTION OF THE DRAWINGS

FIG. 7 is an enlarged view of a end sealing mechanism shown in FIG. 2, FIGS. 8a to 8c are views for explaining the filling-packing operation of the forming, filling and sealing machine illustrated in FIG. 1 and FIG. 2.

DESCRIPTION OF THE PREFERRED EMBODIMENTS

First Embodiment

Figure 1:
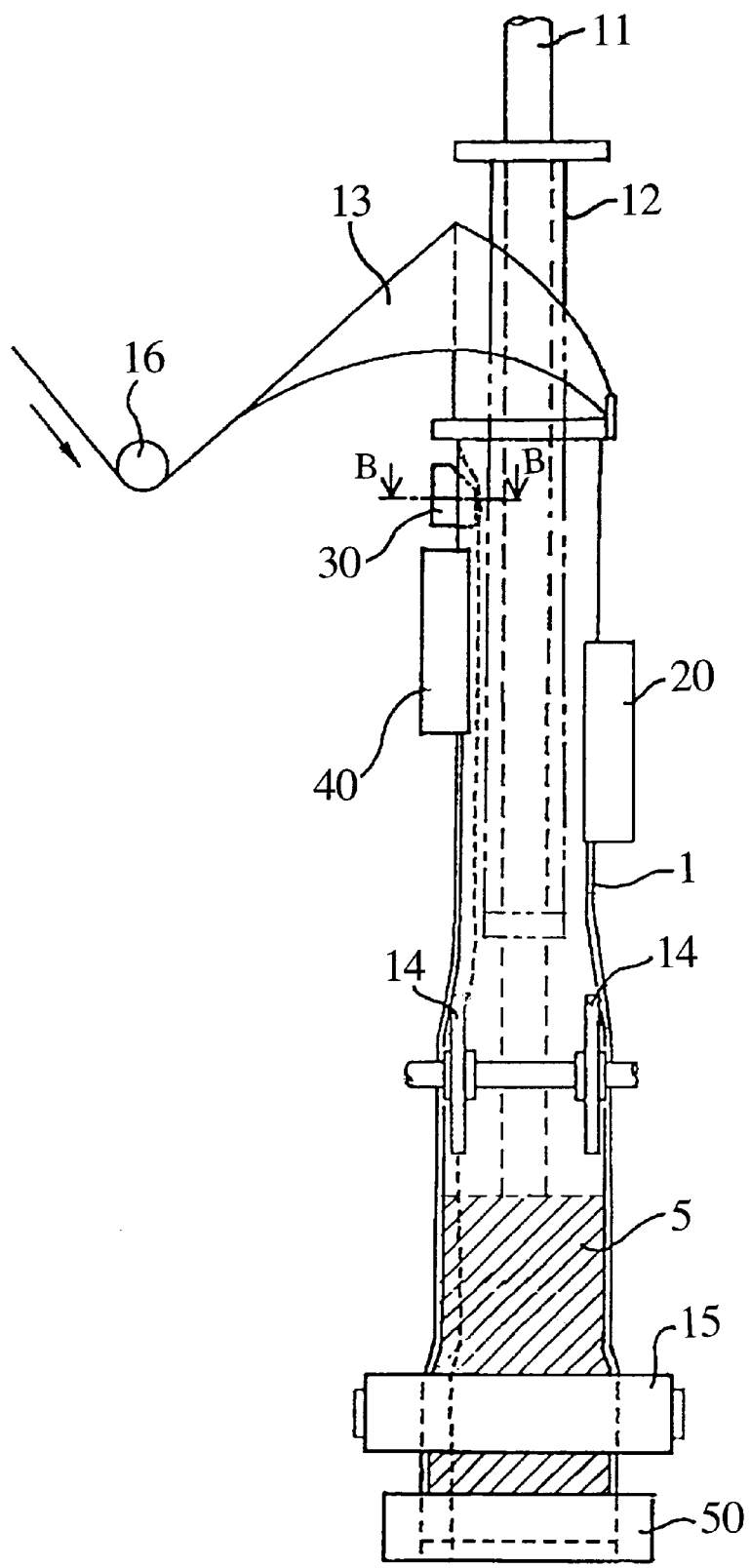
FIG. 1 is a schematic elevation of a forming, filling and sealing machine according to a first embodiment of the present invention.
Figure 2:
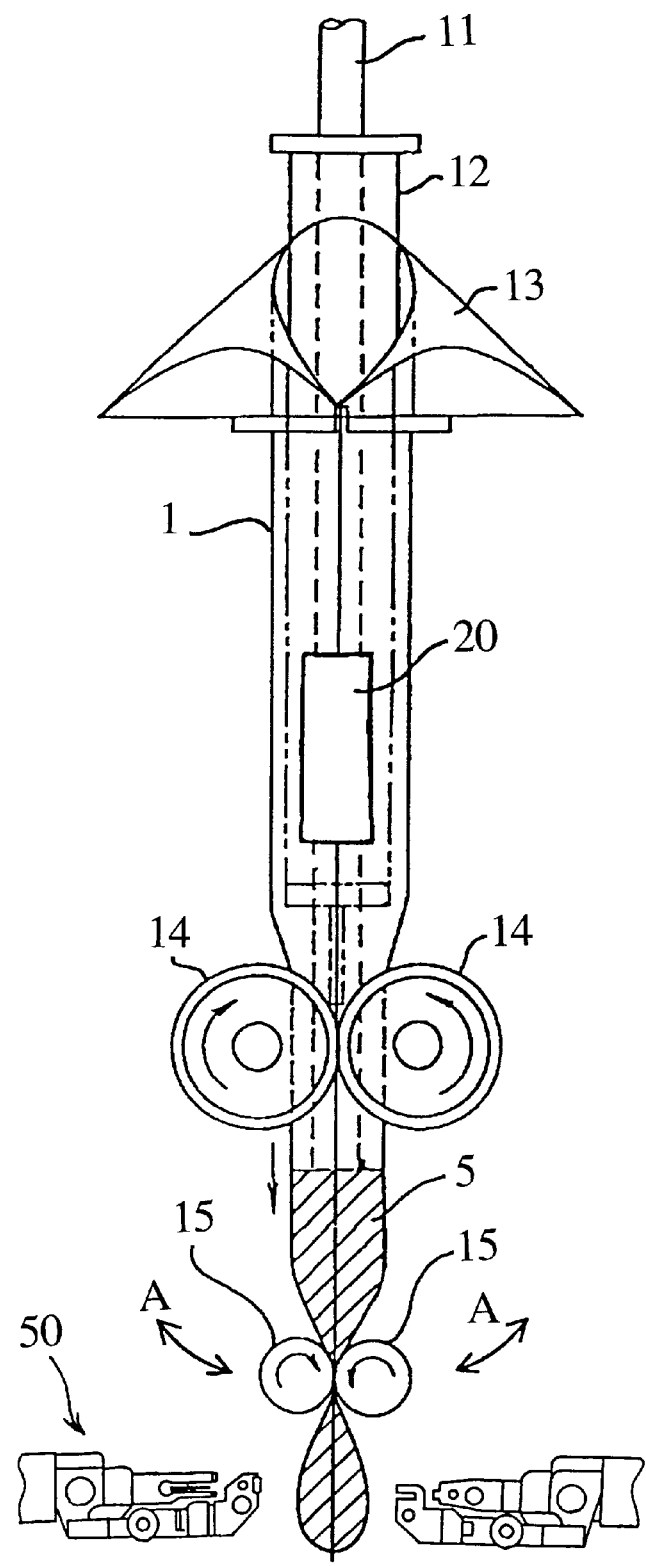
FIG. 2 is a schematic side elevation of the forming, filling and sealing machine shown in FIG. 1.
Figure 9A:
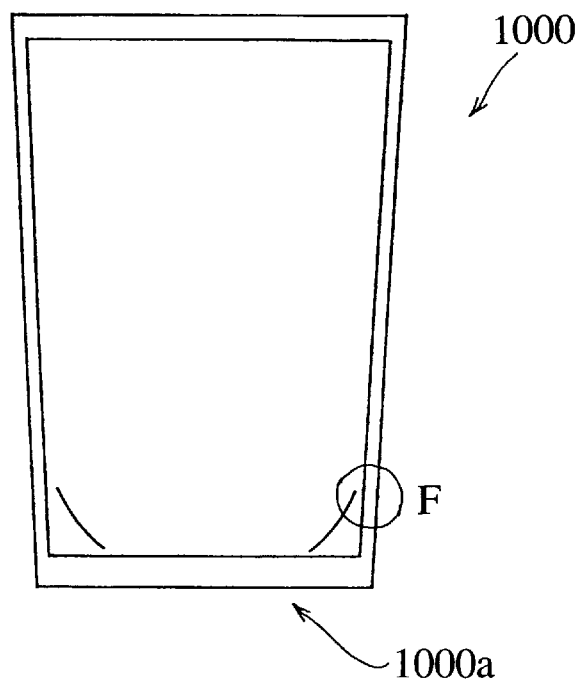
FIG. 9a is an elevation of a standing pouch manufactured by the forming, filling and sealing machine shown in FIG. 1 and FIG. 2.

Referring now to FIG. 1 and FIG. 2, there is shown a forming, filling and sealing machine according to the first embodiment of the present invention. The forming, filling and sealing machine is a vertical type forming, filling and sealing machine for manufacturing standing pouch 1000 shown in FIG. 9 by bagging liquefied or paste filling material 5 injected through injection pipe 11 provided inside main pipe 12.

On the outer circumference of main pipe 12, there is provided film forming guide 13 for overlapping both side ends of sheet film 1 supplied through tension roller 16 for successively forming it into a tubular shape.

Film 1 formed into a tubular shape by means of film forming guide 13 is vertically heat sealed along a side edge of the overlapped surface by top sealing mechanism 20 provided below film forming guide 13. Now, since top sealing mechanism 20 is similar in structure to the vertical sealing mechanism used in a general vertical type forming, filling and sealing machine, the description of top sealing mechanism 20 will be omitted.

On the opposite side of top sealing mechanism 20 on the other side of main pipe 12, bottom sealing mechanism 40 is disposed for vertically heat sealing film 1. Bottom sealing mechanism 40 is used for forming the part which becomes bottom 1000a (refer to FIG. 9) of standing pouch 1000 manufactured with this forming, filling and sealing machine. Before the heat sealing step performed by bottom sealing mechanism 40, a fold is formed in film 1 along the longitudinal direction thereof. Therefore, folding mechanism 30 is disposed above bottom sealing mechanism 40 for forming a fold in film 1. Folding mechanism 30 and bottom sealing mechanism 40 will be described below.

Figure 3:
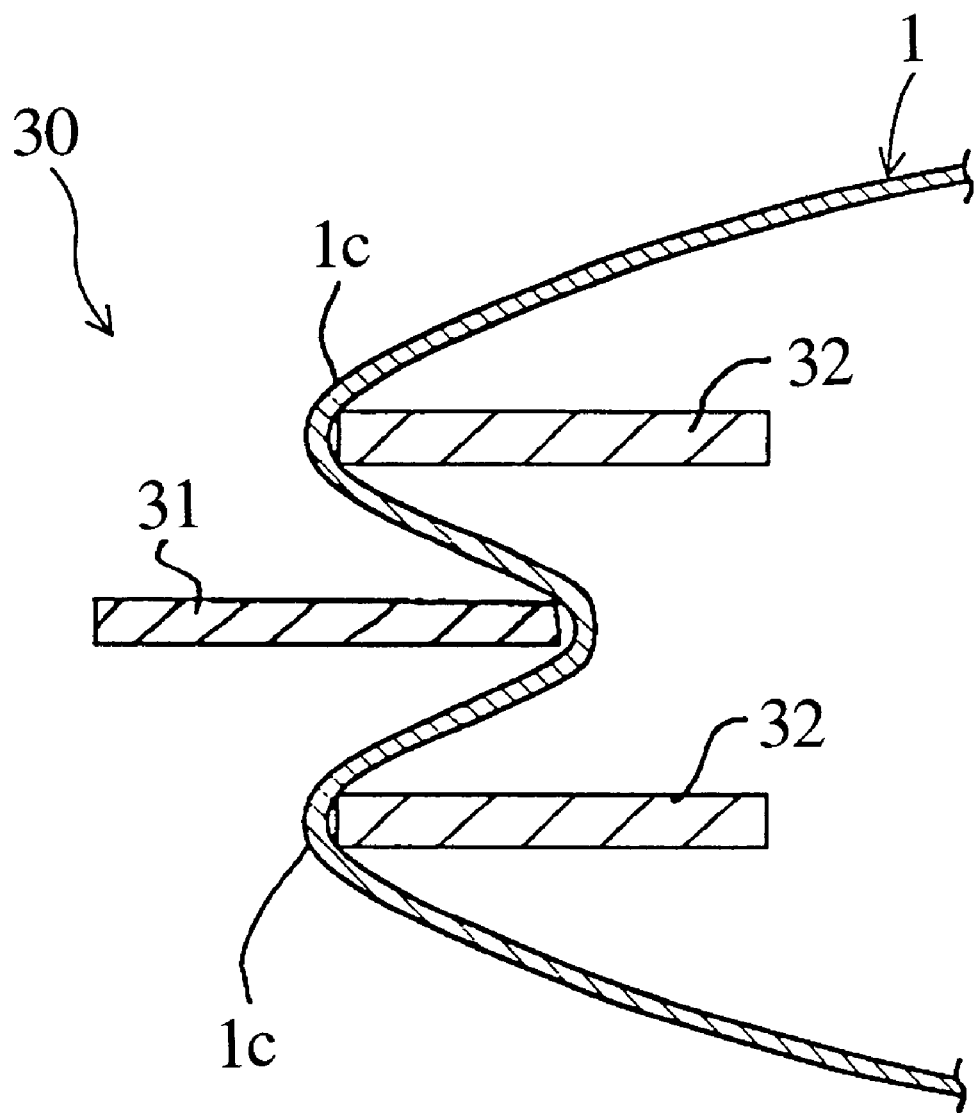
FIG. 3 is a sectional view taken along B—B line of a folding mechanism shown in FIG. 1.

First, folding mechanism 30 will be described with reference to FIG. 3. As shown in FIG. 3, folding mechanism 30 is composed of push plate 31 and two check plates 32. Each check plate 32 is disposed inside film 1 being spaced from each other. Push plate 31 is disposed on the outside of film 1 its side end protruding between check plates 32.

Film 1 formed into a tubular shape by film forming guide 13 (refer to FIG. 1) is tucked in by push plate 31 at the part opposite to the part to be heat sealed by top sealing mechanism 20 and both sides of the tucked part are held by the two check plates 32. Accordingly, film 1 is folded into a cross section of a W shape thereby forming two ridge portions 1c.

Figure 4A:
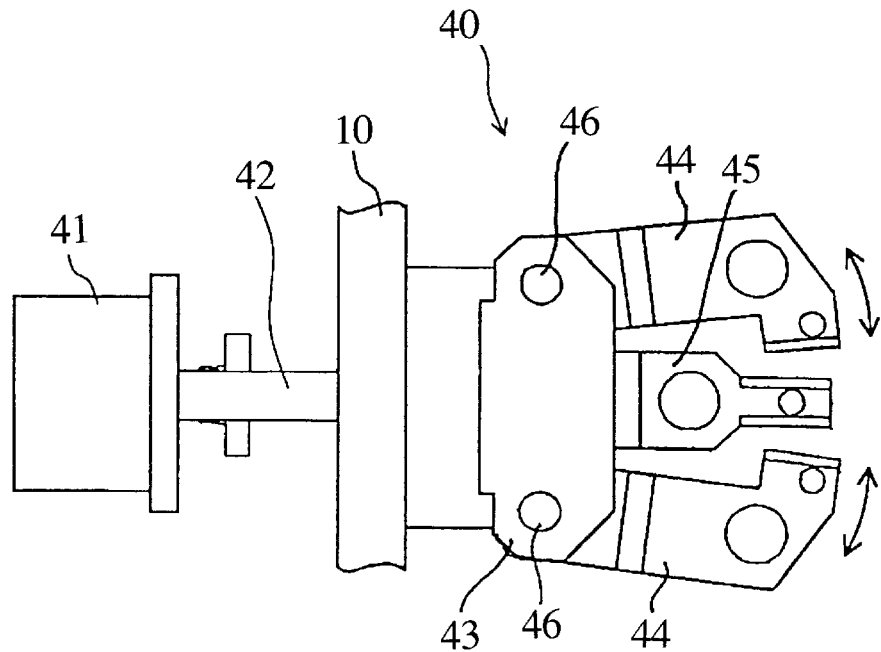
FIG. 4a is a top view of a bottom sealing mechanism shown in FIG. 1.
Figure 4B:
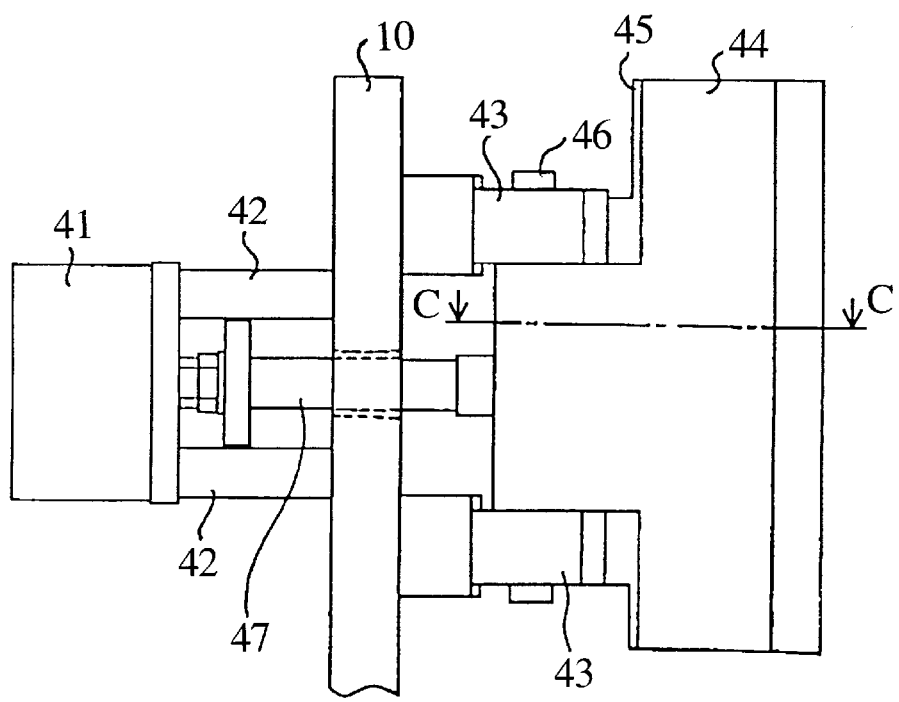
FIG. 4b is a side view of the bottom sealing mechanism shown in FIG. 1.

Bottom sealing mechanism 40 will next be described with reference to FIGS. 4a, 4b and 5. As shown in FIGS. 4a and 4b on frame 10 of this forming, filling and sealing machine, two heater bar supporting members 43 are fixed vertically spaced to each other. Two heater bar shafts 46 are firmly set between heater bar supporting members 43. Each heater bar shaft 46 is provided with heater bar 44 which is rotatable in the direction of the arrow shown in the FIG. 4a and has a built-in heating means (not shown) such as an electric heater. Each heater bar 44 is boosted by a boosting means such as a spring toward the direction for the ends of the heater bars to approach each other.

Heater bar receiver 45 is fixed between heater bar supporting members 43, being disposed between heater bars 44. At the top of each heater bar 44, a pressure surface is provided projecting toward heater bar receiver 45. These pressure surfaces on both heater bars 44 are pressed on both sides of heater bar receiver 45 by the boosting force of the above boosting means.

Cylinder 41 is fixed on frame 10 by means of cylinder fixing member 42. Cylinder 41 has a rod which is fixed toward heater bar 44. Pushing rod 47 is fixed to the rod of cylinder 41 penetrating through frame 10. As shown in FIG. 5, pushing rod 47 is located at the intermediate position between respective heater bar shafts 46, and by projecting the rod of cylinder 41, pushing rod 47 is pressed on projection 44a formed on the mutually opposing portion of each heater bar 44. Consequently, each heater bar 44 is rotated in the direction opening to each other withstanding the boosting force of the boosting means, thereby forming a clearance between the pressure surface of each heater bar 44 and heater bar receiver 45.

Figure 6:
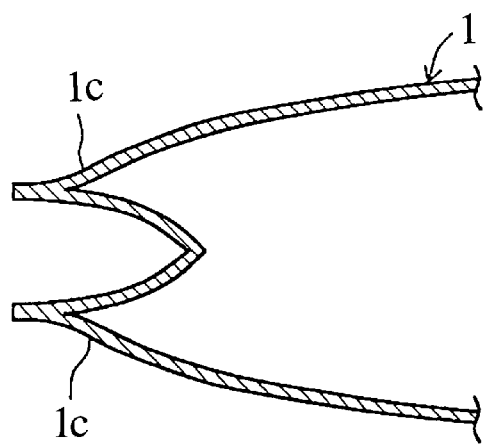
FIG. 6 is a sectional view of a primary part of a tubular film heat sealed by the bottom sealing mechanism.

Two ridge portions 1c formed in film 1 by folding mechanism 30, as shown in FIG. 3, pass between the pressure surface of heater bars 44 and heater bar receiver 45, respectively. When the rod of cylinder 41 is pulled when feed of film 1 is stopped, the pressure force of projection 44a on heater bar 44 from by pushing rod 47 is released, and each heater bar 44 rotates around heater bar shaft 46 by the boosting force of their respective boosting means, and the pressure surface of each heater bar 44 is pressed on heater bar receiver 45. Then, by driving the heating means of each heater bar 44, the top of each ridge portion 1c of film 1 is heat sealed along the longitudinal direction of film 1, as shown in FIG. 6.

Again returning to FIG. 1 and FIG. 2, below main pipe 12, two pairs of feed rollers 14 are provided for keeping pressure contact with both sides of film 1 placed therebetween, film 1 being already heat sealed by top sealing mechanism 20 and bottom sealing mechanism 40. By rotating feed rollers 14 while keeping pressure contact with film 1 placed therebetween, film 1 is carried downwardly.

Below feed rollers 14, a pair of squeezing rollers 15 are provided for rotating in synchronization with the rotation of feed rollers 14. Squeezing rollers 15 are used to divide filling material 5 by applying pressure contact to film 1 placed therebetween, being provided movably in a confronting manner in the direction of arrow A shown in FIG. 2.

End sealing mechanism 50 is provided below squeezing rollers 15 for horizontally heat sealing film 1.

End sealing mechanism 50 will be described with reference to FIG. 7. In FIG. 7, two cylinders 51, 56 are provided with each rod facing each other, with film 1 interposing them. Each cylinder 51, 56 is fixed to each of sliders (not shown) which slide horizontally in the opposite direction.

To the rod of one cylinder 51, cutter holding plate 52 is fixed for holding cutter 53 in a retractable manner. Also on cylinder 51, heater bar receiver 54 which is a member for receiving heater bar 57, later described, is provided with supporting shaft 51*a* as center rotatable in the direction of arrow D. Although heater bar receiver 54 is initially boosted by a spring (not shown) for counterclockwise rotation as illustrated, the position of the top of heater bar receiver 54 is controlled so that it does not rotate over the height approximately equal to the position of heater bar 57 to be described later. To the top surfaces of cutter holding plate 52 and heater bar receiver 54, pieces of silicon rubbers are stuck.

A cam 52*d* is provided on the rod of cylinder 51, and cam receiving roller 54*a* is provided on heater bar receiver 54 so that it runs on the cam face of the cam 52*d* when the rod of cylinder 51 is advanced. According to this constitution, when the rod of cylinder 51 is advanced to cause cam receiving roller 54*a* to run on cam 52*a*, heater bar receiver 54 is turned clockwise against the boosting force of the above spring.

On the rod of the other cylinder 56, heater bar 57 having built-in heating means (not shown) such as an electric heater is fixed. Further, on the cylinder 56, cooling bar 58 which is a member for receiving cutter holding plate 52 is provided to be rotatable in the direction of arrow E centered on supporting shaft 56*a*. Although cooling bar 58 is boosted by a spring (not shown) for clockwise turn as illustrated, the position of the top of cooling bar 58 is controlled so that it does not rotate about the approximate height of the position of cutter holding plate 52. In the top of cooling bar 58, a groove is provided into which cutter 53 can enter when cutter 53, held in cutter holding plate 52, is advanced.

Cam 57*a* is provided on the rod of the cylinder 56, and cam receiving roller 58*a* is provided on cooling bar 58 so that it runs on the cam face of cam 57*a* when the rod of cylinder 56 is advanced. Accordingly, when the rod of cylinder 56 is advanced and cam receiving roller 58*a* runs on cam 57*a*, cooling bar 58 turns counterclockwise against the boosting force of the above spring.

It is noted that the present embodiment shows end sealing mechanism 50 in which an electric heater is provided only in the heater bar. However, as described later, since end sealing mechanism 50 heat seals, although not wholly but partially, four layers of film, for the purpose of generating a larger amount of heat and securely performing the heat sealing of this portion, it is preferable to also equip heater bar receiver 54 with the electric heater.

Next, the filling and closing motion by means of the forming, filling and sealing machine of the present embodiment will be described with reference to FIG. 2 and FIGS. 8*a*–8*c*.

First, in FIG. 2, while keeping squeezing rollers 15 and end sealing mechanism 50 open, the machine is operated to inject filling material 5 from injection pipe 11 inside film 1 and concurrently rotate feed rollers 14 to carry film 1 downward. Since top sealing mechanism 20 and bottom sealing mechanism 40 are provided above the lower end of injection pipe 11, the portion into which filling material 5 is injected has already been heat sealed by top sealing mechanism 20 and bottom sealing mechanism 40.

When film 1 is carried by a fixed distance, squeezing rollers 15 are closed to divide filling material 5 as shown in FIG. 2.

When film 1 is carried further downward from the above state by means of feed rollers 14 and squeezing rollers 15, as shown in FIG. 8*a*, unfilled portion 1*b* in which there is no filling material exists is formed in film 1.

When unfilled portion 1*b* is carried between end sealing mechanism 50, the feed of film 1 is stopped and each slider is driven to move each cylinder 51, 56 to approach. At this time, heater bar 57 has already been advanced and heater bar 57 and heater bar receiver 54 are facing each other. When each cylinder approaches, as shown in FIG. 8*b*, heater bar 57 and heater bar receiver 54 are closed, thereby pressing unfilled portion 1*b*. Then closed heater bar 57 and heater bar receiver 54 heat seal unfilled portion 1*b* by activating the heating means built into heater bar 57.

After finishing this heat sealing process, as shown in FIG. 8*c*, the machine moves heater bar 57 back and concurrently advances the cutter holding plate 52. By this operation, cooling bar 58 and heater bar receiver 54 each turn clockwise, and cooling bar 58 moves to a position confronting cutter holding plate 52, while heater bar receiver 54 retreats downward. As a result, unfilled portion 1*b* is pressed by cooling bar 58 and cutter holding plate 52. In this state, the heat sealed portion is cooled and then cutter 53 is further advanced to cut off the heat sealed portion.

After cutting off the heat sealed portion, the machine moves back each cylinder 51, 56 to drop the package. Then, the machine moves away cutter holding plate 52, brings back heater bar receiver 54 to the original position, and then opens squeezing rollers 15 to make the filling material drop for next filling.

Figure 9B:
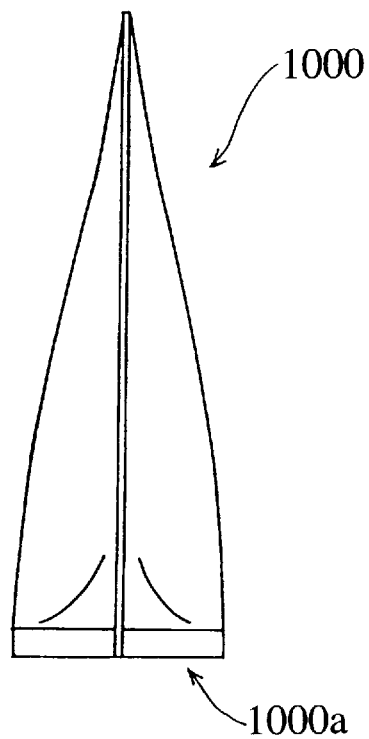
FIG. 9b is a side elevation of the same standing pouch.

The package obtained as above becomes standing pouch 1000 which can stand by itself, as shown in FIG. 9, placing the portion heat sealed by bottom sealing mechanism 40 (refer to FIG. 1) as the bottom. Since the portion heat sealed by bottom sealing mechanism 40 acts as a rib, this standing pouch 1000 can stand stably without crushing the bottom 1001*a*. Further, since this machine performs bag forming and filling simultaneously, the machine can produce standing pouch 1000 efficiently.

Further, since the present invention performs bag forming placing the portion which becomes bottom 1000*a* of standing pouch 1000 laterally, it can perform bag forming and filling through a process in which film 1 is concurrently carried downwardly. As a result, when compared to the conventional case in which injection the filling material and hermetic sealing are performed while carrying a bag with an open top in the horizontal direction, the installation area of the forming, filling and sealing machine is smaller and dust hardly enters the bag. In addition, by performing the injection operation of filling material 5 while holding the portion which serves as bottom 1000*a* of standing pouch 1000 horizontally, the diameter of injection pipe 11 can be increased compared to the conventional one. Resultantly, the amount of filling material 5 injected in a time unit can be increased, and hence injection time of filling material 5 is reduced, thereby increasing efficiency of production of the standing pouch 1000.

On the other hand, both sides of standing pouch 1000 are heat sealed by end sealing mechanism 50 as described above. However, end sealing mechanism 50 of the present embodiment performs heat sealing and cooling as well as cutting of the heat sealed portion by separate means, when feed of film 1 is in a stopped state. Therefore, film 1 is cooled immediately after heating is finished, and hence each heating, cooling and cutting process of film 1 can be performed efficiently, thereby achieving high speed operation from heat sealing through cutting process, and consequently increasing the heat sealing strength, and obtaining a reduced sealing width.

Particularly, in the portion heat sealed by end sealing mechanism 50, film 1 is quadruplicate at the portion corresponding to ridge portions 1c shown in FIG. 3. When standing pouches 1000 are displayed as commodities, the quadruplicate heat sealed portions are placed to show at both side ends. Therefore, end sealing mechanism 50 is required to perform certain heat sealing of the quadruplicate film. Also it is preferable that the seal widths of both sides are as narrow as possible for efficient display of commodities side by side without clearance. Therefore, end sealing mechanism 50 of the present embodiment which gives strong seal strength and narrow seal width is suitable as the heat sealing mechanism to be used in the present invention.

Further, since end sealing mechanism 50 is applied to the heat sealing of unfilled portion 1b formed by squeezing rollers 15, air being introduced into standing pouch 1000 is prevented. As a result, in packing of foods, packed foods can be prevented from oxidizing or rotting.

Now, as described above, in the heat sealed portion of both side ends of standing pouch 1000, the portion of film 1 corresponding to ridge portions 1c shown in FIG. 3 is of four layers and more difficult to heat seal than other portions. Particularly, the top (part F in FIG. 9a) of the inwardly folded portion of film 1 is liable to have concentrated stress when the internal pressure is applied to the bottom of standing pouch 1000 due to an impact from such as a drop, and further since the part F is on the boundary of the quadruplicate film portion and the double film portion of film 1, there is concern that the heat seal may come off at the part F.

Figure 10:
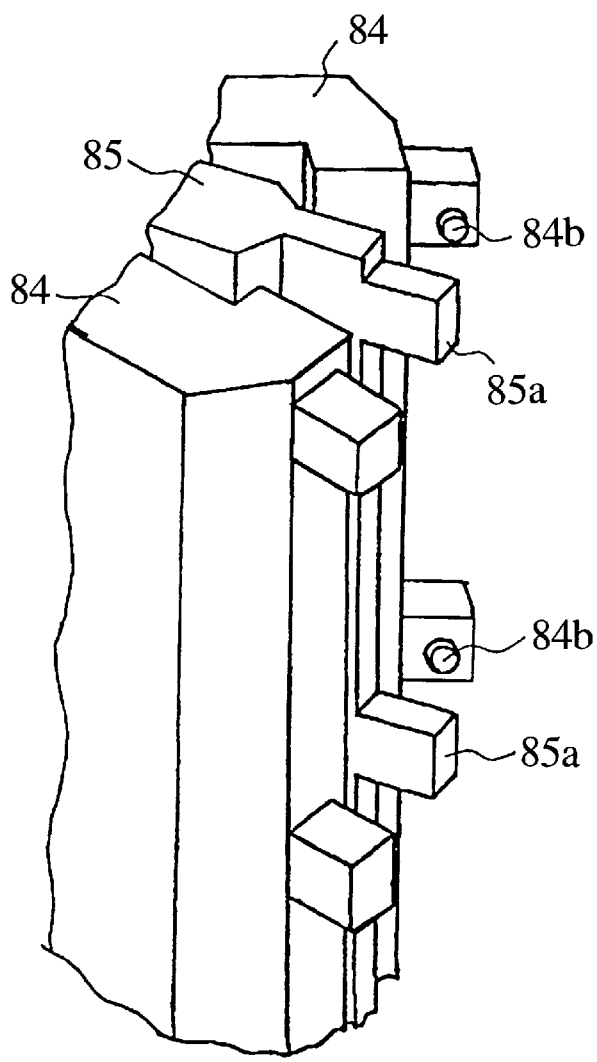
FIG. 10 is a perspective view of a primary part of a modified example with reference to the bottom sealing mechanism shown in FIG. 4.

Therefore, to prevent the exfoliation of the heat sealed portion, it is preferable to use a bottom sealing mechanism as shown in FIG. 10. The bottom sealing mechanism shown in FIG. 10 has heater bars 84 on the top of which a plurality of bumps 84b for spot heat sealing are provided, vertically spaced from each other. Bumps 84b for spot heat sealing are disposed at positions corresponding to the corners of the bottom and both sides of standing pouch 1000 (refer to FIG. 9) produced. The number of bumps 84b for spot heat sealing provided on one heater bar 84 is, for example, two when the vertical length of heater bar 84 is the length corresponding to one bag length of standing pouch 1000, and four when the relative length of heater bar 84 corresponds to two bag lengths thereof.

Further, a plurality of bumps 85a for receiving projections 84b for spot heat sealing are uniformly provided in heater bar receiver 85. By closing each heater bar 84, the top of projections 84b for spot heat sealing are pressed on the side of projections 85a, respectively, thereby spot heat sealing a part of two ridge portions 1c shown in FIG. 3.

Figure 5:
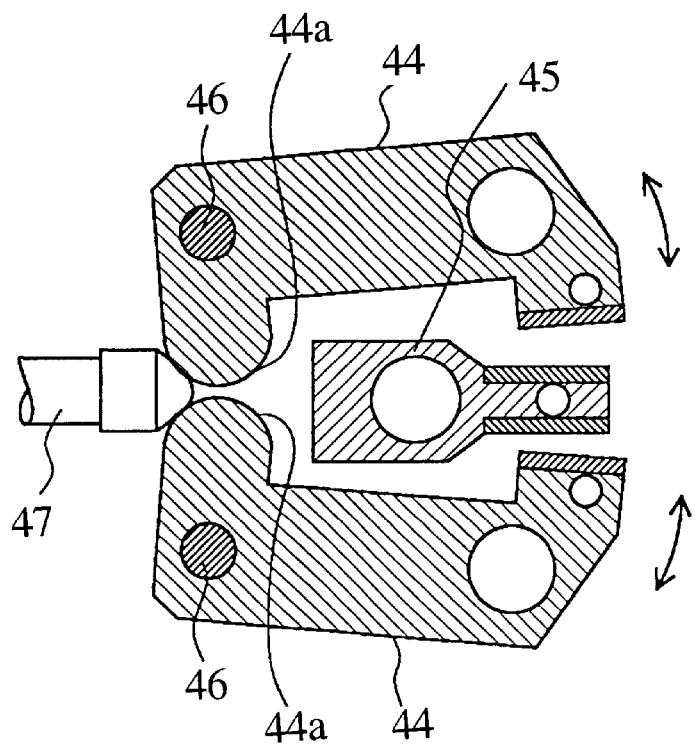
FIG. 5 is a sectional view taken along C—C line of the bottom sealing mechanism shown in FIG. 4b.

Since the other composition is similar to that of the bottom sealing mechanism shown in FIGS. 4a,4b and 5, the detailed explanation thereof is omitted.

Figure 11:
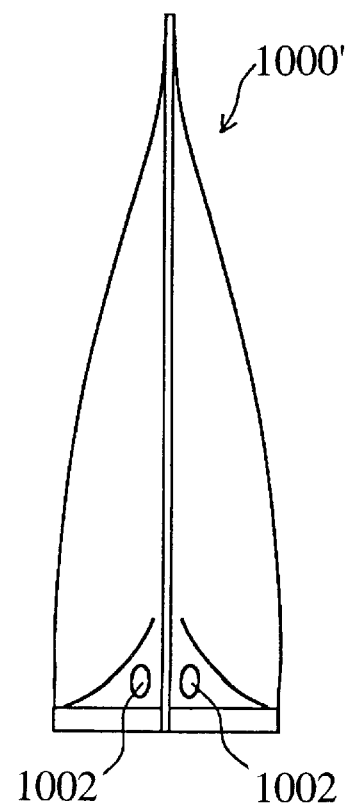
FIG. 11 is a side elevation of the standing pouch whose bottom is heat sealed with the bottom sealing mechanism shown in FIG. 10.

As shown in FIG. 11, by using the bottom sealing mechanism shown in FIG. 10, spot welds 1002 (only two spots are shown in FIG. 11) are formed at four places on the side bottom parts of standing pouch 1000. With these spot welds 1002, the extension of the ridge portions in the vicinity of the side of standing pouch 1000 can be aboided. Consequently, large internal pressure becomes hard to generate in the F portion, thereby maintaining the heat seal of the portion in a stable condition hard to come off.

Second Embodiment

A second embodiment of the present invention will be described with reference to FIGS. 12–20.

Figure 12:
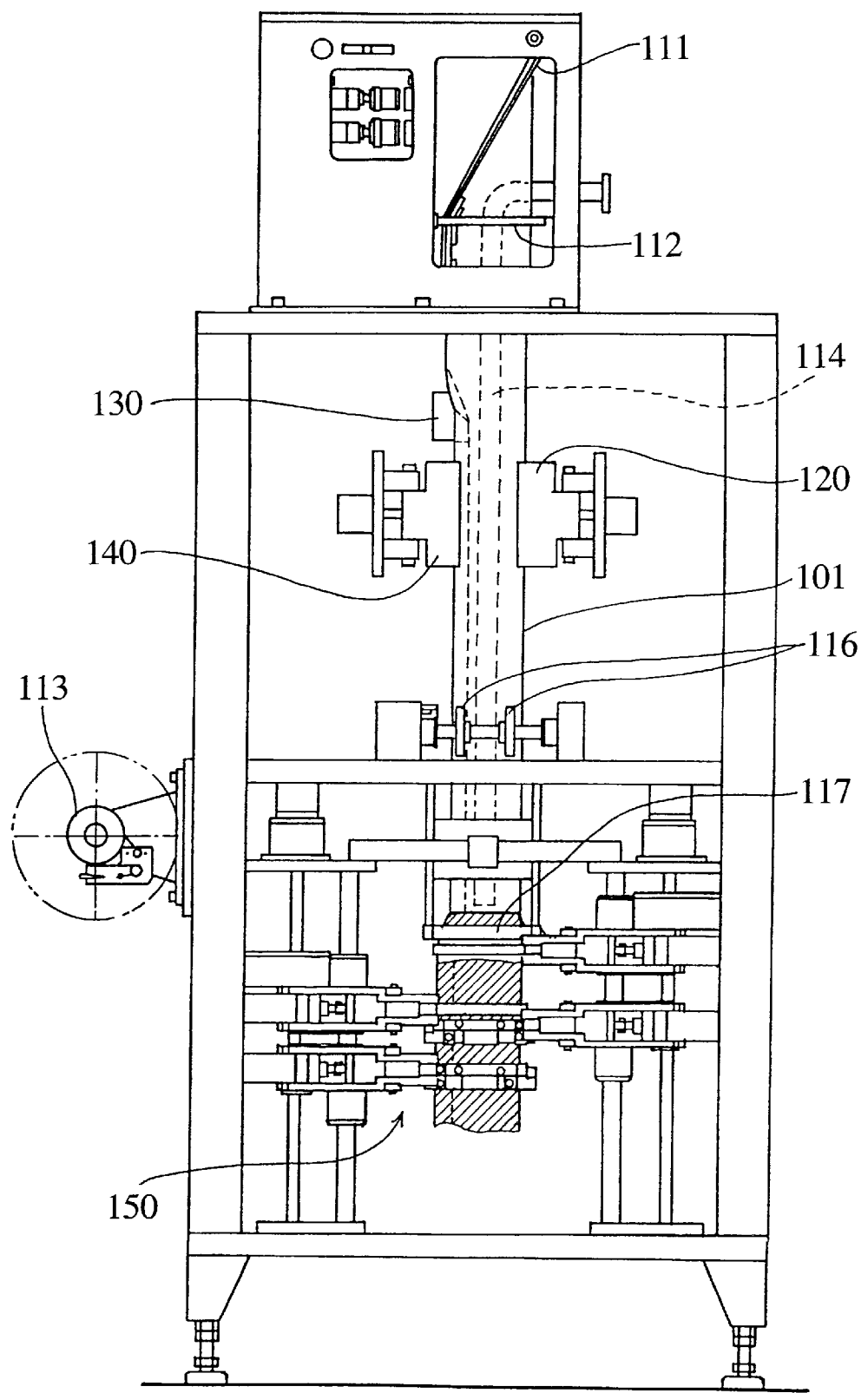
FIG. 12 is an elevation of a forming, filling and sealing machine according to a second embodiment of the present invention.
Figure 13:
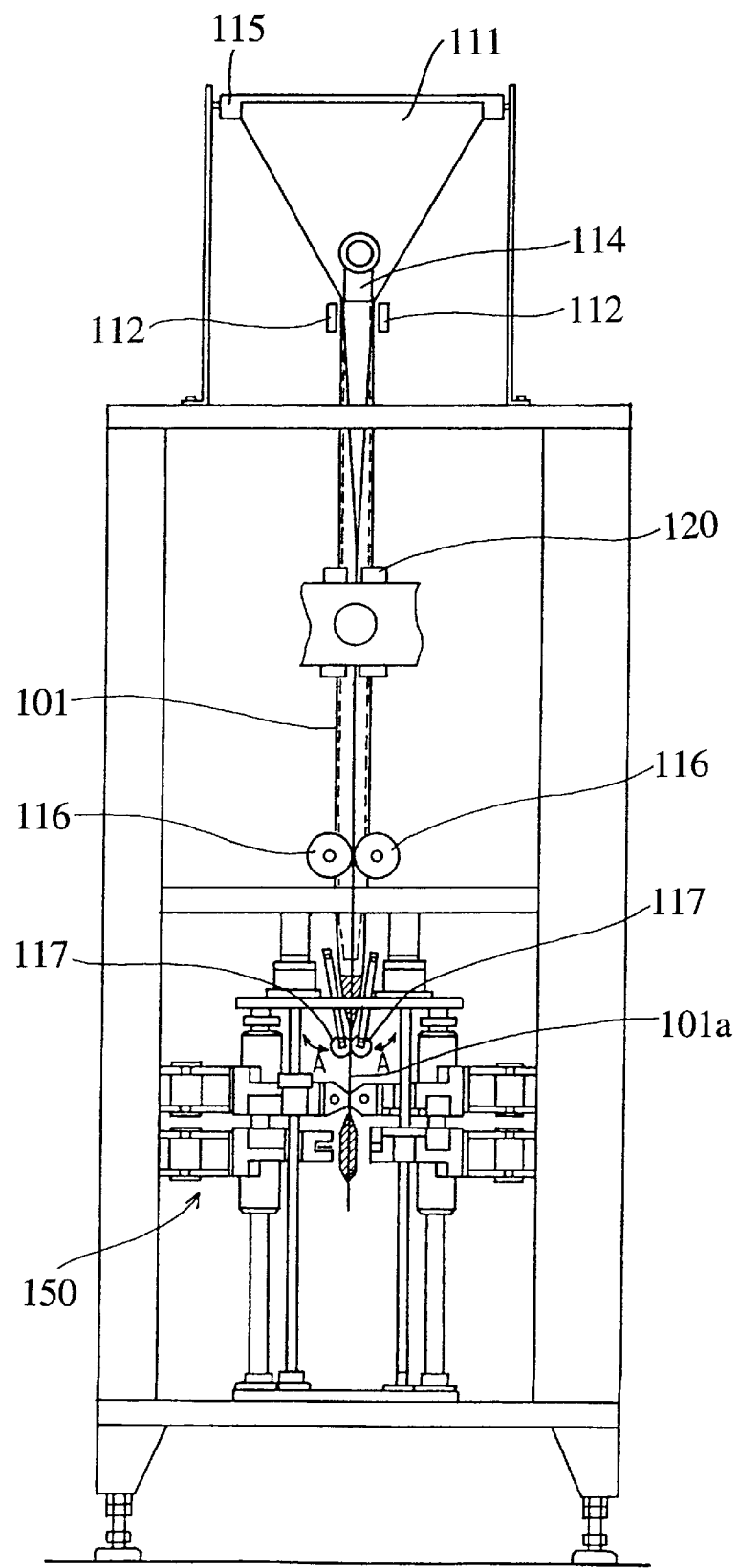
FIG. 13 is a side elevation of the forming, filling and sealing machine shown in FIG. 12.
Figure 14:
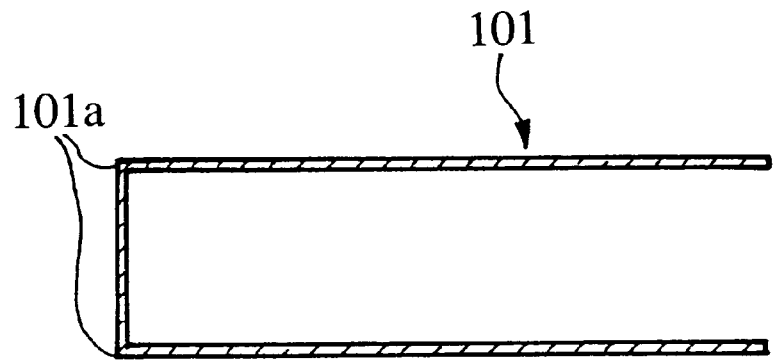
FIG. 14 is a cross sectional view of a film passed through a bag making guide and a guide arm shown in FIG. 12.

Referring now to FIGS. 12 and 13, there is shown a forming, filling and sealing machine according to the second embodiment of the present invention. Film forming guide 111 for folding both side ends of sheet film 101 to make them coincide with each other is provided above injection pipe 114, sheet film 101 being supplied from film supply roller 113 through a tension roller (not shown) and guide roller 115. Film forming guide 111 is obliquely disposed so that film 101 can pass over the surface thereof, composing a trapezoid plate with the bottom side shorter than the top side, and two film guide arms 112 disposed in the vicinity of the bottom side of the trapezoid plate for checking the extension of film 101 passing over the surface of the trapezoid plate. Owing to the above constitution, two edges 101a are formed in film 101 as shown in FIG. 14, and a region between these edges 101a becomes bottom 1000a of standing pouch 1000 shown in FIG. 9.

Figure 15:
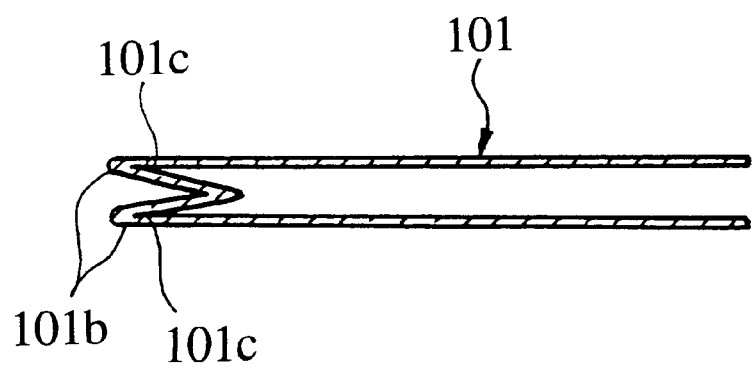
FIG. 15 is a cross sectional view of a film passed through a folding mechanism shown in FIG. 12.

Below film forming guide 111, folding mechanism 130 is disposed for further folding the middle part of the region between two edges 101a formed in film 101 by film forming guide 111. Folding mechanism 130 is constructed similarly to the folding mechanism explained in the first embodiment, and film 101 passing folding mechanism 130 is folded into a W form as shown in FIG. 15 to form two ridge portions 101b.

Below folding mechanism 130, bottom sealing mechanism 140 is disposed for sealing two ridge portions 101b, formed by folding mechanism 130, along the longitudinal direction of film 101. Further, on the position confronting bottom sealing mechanism 140 across injection pipe 14, top sealing mechanism 120 is disposed for heat sealing the matching surface prepared by overlapping open ends of film 101 along the side edge thereof. By heat sealing the side edge portion of the matching surface of film 101, film 101 is processed into a tubular form.

Top sealing mechanism 120 is similar to the vertical sealing mechanism for use in a conventional vertical type forming, filling and sealing machine, and bottom sealing mechanism 140 is also similar to the one shown in the first embodiment. Therefore, detailed explanation with regard to these top sealing mechanism 120 and bottom sealing mechanism 140 will be omitted.

Further referring to FIG. 12 and FIG. 13, it is known that, below bottom sealing mechanism 140 and top sealing mechanism 120, two pairs of feed rollers 116 for pressure holding both sides of film 101 heat sealed by above sealing mechanisms are provided. Film 101 is carried downward by rotating feed rollers 116 while squeesing film 101 between them.

Below feed rollers 116, there are provided a pair of squeezing rollers 117 which are oppositely disposed to each other with film 101 interposing them and rotated in synchronization with the rotation of feed rollers 116. By squeezing film 101 from both sides, squeezing rollers 117 serve to divide a filling material (shown with oblique lines) injected into film 101, being provided so as to be movable in the direction of arrow A driven by a driving means (not shown). By squeezing film 101 from both sides and rotating, squeezing rollers 117 carry film 101 downward cooperating with feed rollers 116. It is noted that the bottom of injection pipe 114 is disposed above squeezing rollers 117 and below bottom sealing mechanism 140. According to this structure, since filling materials are injected into the space below bottom sealing mechanism 140, bottom sealing mechanism 140 is kept free of filling material and good heat sealing can be performed.

Below squeezing rollers 117, there is provided end sealing apparatus 150 for heat sealing laterally (horizontally) film 101 which already contains filling material.

End sealing apparatus 150 will be described with reference to FIGS. 16–18.

Figure 16:
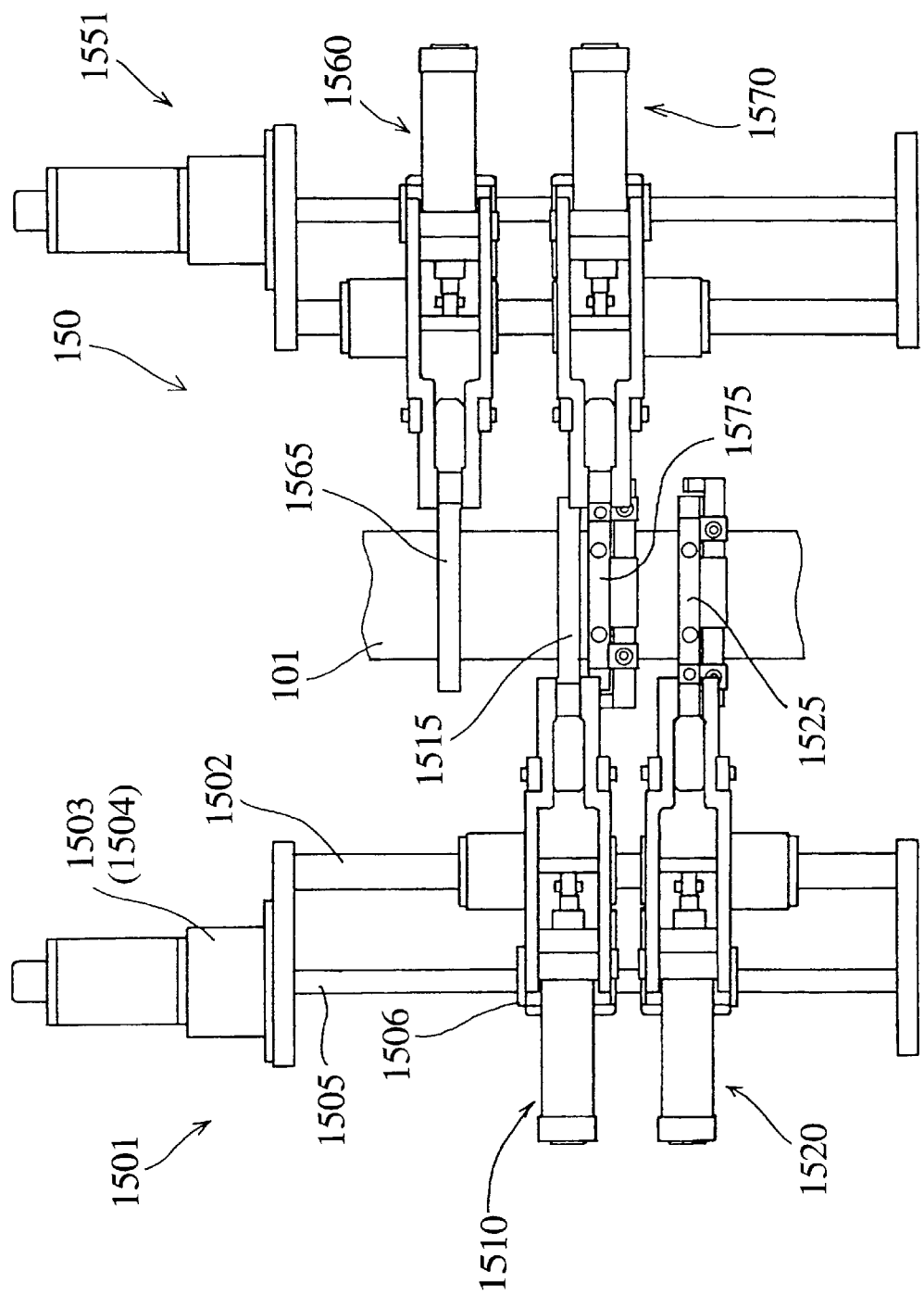
FIG. 16 is an elevation of a end sealing apparatus shown in FIG. 12.

As shown in FIG. 16, end sealing apparatus 150 is composed of two units 1501, 1551. Units 1501, 1551 are disposed opposite to each other with a pass route for film 101 between them. Each unit 1501, 1551 is independently driven for horizontally heat sealing and cutting film 101.

Figure 17:
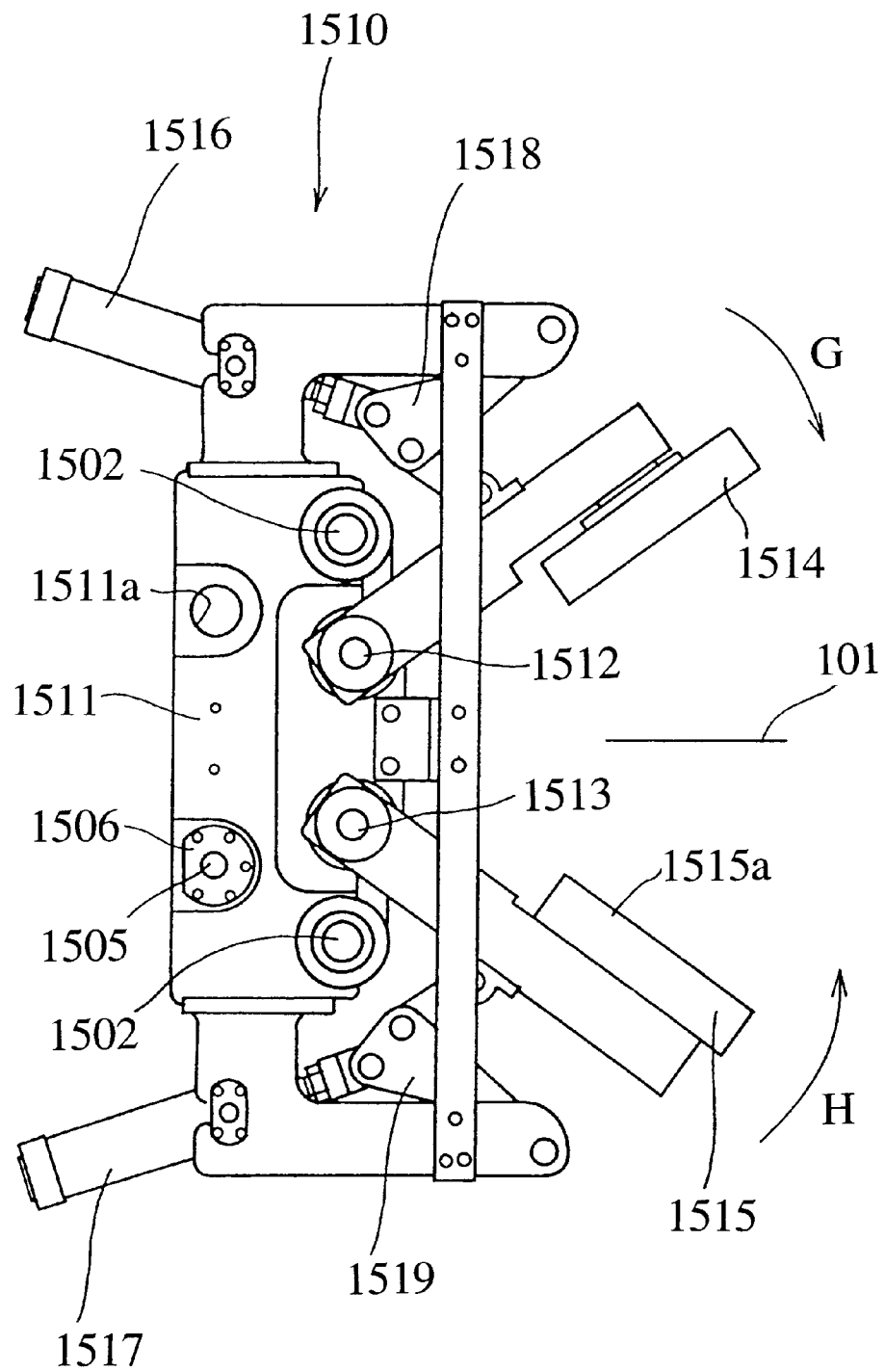
FIG. 17 is a plan view of a first sealing mechanism of the end sealing apparatus shown in FIG. 16.
Figure 18:
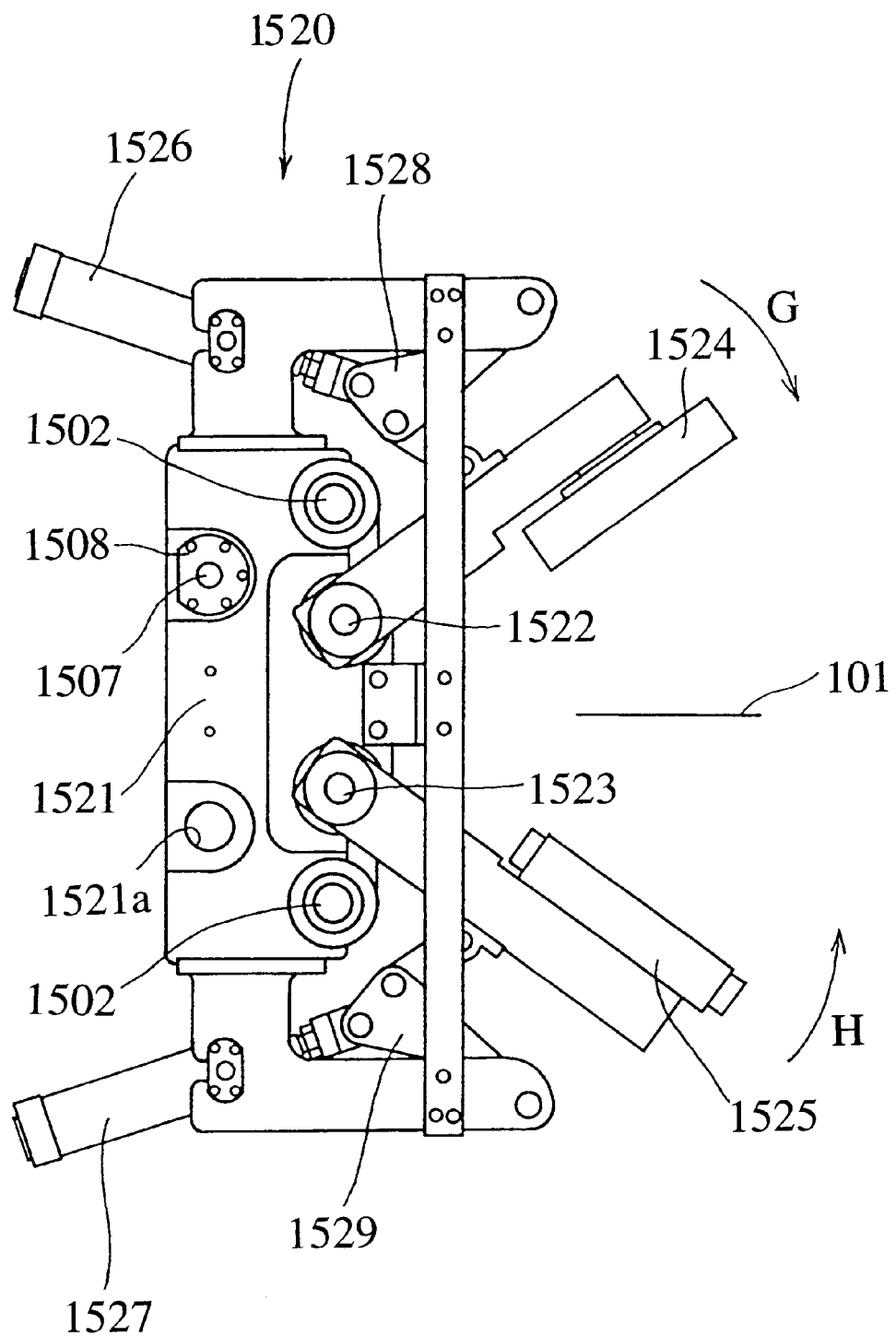
FIG. 18 is a plan view of a first cooling mechanism of the end sealing apparatus shown in FIG. 16.

As shown in FIGS. 16–18, a first unit 1501 comprises a first sealing mechanism 1510 and a first cooling mechanism 1520 both vertically slidably supported on two perpendicularly extending guide shafts 1502.

As shown in FIG. 17, the first sealing mechanism 1510 includes supporting frame 1511 supported by guide shaft 1502, and a first heater bar 1514 and a first heater bar receiver 1515 provided in this supporting frame 1511 to be rotatable on the horizontal surface centered on supporting shafts 1512, 1513, respectively. The first heater bar 1514 has a built-in heating means (not shown) such as an electric heater. The first heater bar 1514 is coupled through coupling member 1518 with drive cylinder 1516 provided in supporting frame 1511. By protruding the rod of drive cylinder 1516, the first heater bar 1514 turns in the direction of arrow G shown in FIG. 17. The first heater bar receiver 1515 is also coupled through coupling member 1519 with drive cylinder 1517 provided in supporting frame 1511. By protruding the rod of drive cylinder 1517, the first heater bar receiver 1515 turns in the direction of arrow H shown in FIG. 17.

Therefore, when the rods of both drive cylinders 1516, 1517 are concurrently protruded, heater bar 1514 and heater bar receiver 1515 are closed together to press film 101. On the contrary, when the rods of both drive cylinders 1516, 1517 are concurrently moved away, heater bar 1514 and heater bar receiver 1515 are opened together to release the pressure on film 101. It is noted that on the pressure surface of heater bar receiver 1515 pressed on the corresponding surface of heater bar 1514, silicon rubber 1515a is stuck.

The first cooling mechanism 1520 is disposed below the first sealing mechanism 1510. As shown in FIG. 18, the first cooling mechanism 1520 includes supporting frame 1521 supported by guide shaft 1502, and a first cooling bar 1524 and a first cooling bar receiver 1525 provided in this supporting frame 1521 rotatable in the horizontal surface centering supporting shafts 1522, 1523, respectively. The first cooling bar 1524 is coupled through coupling member 1528 with drive cylinder 1526 provided in supporting frame 1521, and by protruding the rod of drive cylinder 1526, the first cooling bar 1524 turns in the direction of arrow G shown in FIG. 18 in the same way as the first heater bar 1514. The first cooling bar receiver 1525 is coupled through coupling member 1529 with drive cylinder 1527 provided in supporting frame 1521, and by protruding the rod of drive cylinder 1527, the first cooling bar receiver 1525 turns in the direction of arrow H shown in FIG. 18 in the same manner as the first heater bar receiver 1515.

Therefore, when both rods of drive cylinders 1526, 1527 are concurrently protruded, cooling bar 1524 and cooling bar receiver 1525 are closed together to press film 101. On the contrary, when both rods of drive cylinders 1526, 1527 are concurrently moved away, cooling bar 1524 and cooling bar receiver 1525 are opened together to release the pressure on film 101.

The first sealing mechanism 1510 and the first cooling mechanism 1520 are driven vertically by means of sealing mechanism drive motor 1503 and cooling mechanism drive motor 1504, respectively. Ball screw 1505 extending in the perpendicular direction is coupled with the rotation shaft of sealing mechanism drive motor 1503. In order to drive vertically the first sealing mechanism 1510 by sealing mechanism drive motor 1503, ball screw 1505 is screwed in ball nut 1506 attached to supporting frame 1511 and penetrates through hole 1521a formed in supporting frame 1521. Therefore, by rotating ball screw 1505 by driving sealing mechanism drive motor 1503, the rotation movement of the ball screw 1505 is converted through ball nut 1506 to the vertical movement of the first sealing mechanism 1510.

On the one hand, ball screw 1507 extending in the perpendicular direction is coupled with the rotation shaft of cooling mechanism drive motor 1504. In order to drive vertically the first cooling mechanism 1520 by cooling mechanism drive motor 1504, ball screw 1507 is screwed in ball nut 1508 attached to supporting frame 1521 and penetrates through hole 1511a formed in supporting frame 1511. Therefore, by rotating ball screw 1507 by driving cooling mechanism drive motor 1504, the rotation movement of the ball screw 1507 is converted through ball nut 1508 to the vertical movement of the first cooling mechanism 1520.

In other words, the first sealing mechanism 1510 and the first cooling mechanism 1520 can move vertically independently of each other.

Figure 19:
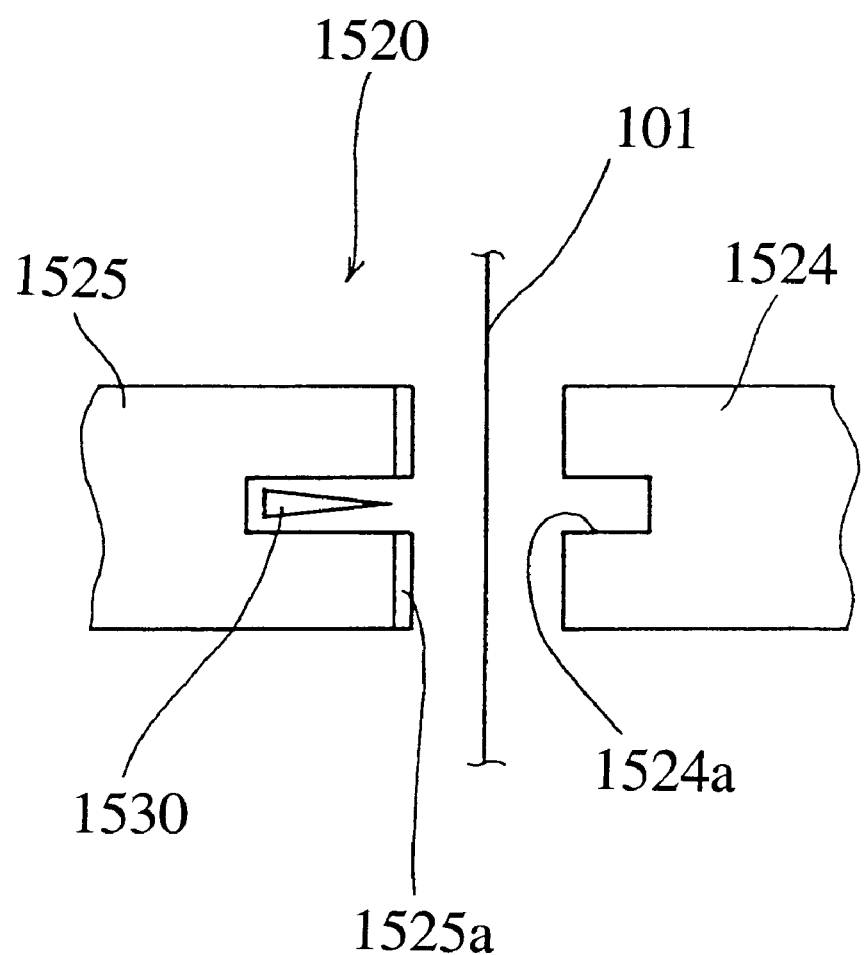
FIG. 19 is a view for explaining the structure of the cooling bar and the cooling bar receiver of the first cooling mechanism shown in FIG. 18, FIGS. 20a to 20k are views for explaining the sealing operation to be performed by the end sealing apparatus shown in FIG. 16.

Here, the structure of cooling bar 1524 and cooling bar receiver 1525 of the first cooling mechanism 1520 will be described with reference to FIG. 19. As shown in FIG. 19, cutter 1530 for horizontally cutting film 101 is held in cooling bar receiver 1525 in a retractable manner against cooling bar 1524 by an air cylinder not shown. On the one hand, in cooling bar 1524, there is formed a groove 1524a into which cutter 1530 can enter when cutter 1530 is advanced. On the surface of cooling bar receiver 1525 confronting the corresponding surface of cooling bar 1524, silicon rubber 1525a is stuck.

Now, cutter 1530 is generally held retracted within cooling bar receiver 1525. However, after cooling bar 1524 and cooling bar receiver 1525 are closed and a predetermined time period later described has elapsed, the cutter 1530 is protruded from cooling bar receiver 1525 to make the top enter groove 1524a of cooling bar 1524 cut film 101.

The first cooling mechanism 1520 serves for efficiently cooling the heat sealed portion of film 101 by the first heat sealing mechanism 1510, through pressure contact between cooling bar 1514 and cooling bar receiver 1525. The first cooling mechanism 1520 is composed of a good heat conductive material such as aluminum. Further, a cooling medium such as liquid or gas for cooling the inside of cooling bar 1524 may be used in order to increase the cooling performance.

Although the first unit 1501 of end sealing apparatus 150 has been described above, the second unit 1551 also has the same constitution as the first unit 1501. In other words, as shown in FIG. 16, the second unit 1551 has a second sealing mechanism 1560 and a second cooling mechanism 1570 vertically slidably supported on two guide shafts 1552 (only one of them is shown). The second sealing mechanism 1560 has a second heater bar 1564 (refer to FIG. 20a) and a second heater bar receiver 1565 both provided to be capable of reciprocal rotation in the horizontal plane for applying pressure, driven by drive cylinders, respectively. The second cooling mechanism 1570 has a second cooling bar 1574 (refer to FIG. 20a) and a second cooling bar receiver 1575 both provided to be capable of relative rotation in the horizontal plane for applying pressure being driven by drive cylinders, respectively. The structure of these second heater bar 1564, second heater bar receiver 1565, second cooling bar 1574 and second cooling bar receiver 1575 are similar with the structure of those first heater bar 1514, first heater bar receiver 1515, first cooling bar 1524 and first cooling bar receiver 1525, so that the description for the former group will be omitted. The vertical movement of the second sealing mechanism 1560 and the second cooling mechanism 1570 are performed independently of each other by means of two respective ball screw mechanisms in the same way the first unit 1501.

Since the first unit 1501 and the second unit 1551 are oppositely disposed as described above, when the first heater bar 1514 and the first heater bar receiver 1515 are closed, the second sealing mechanism 1560 can be moved from above the first sealing mechanism 1510 to below thereof, or from below to above the same while the second heater bar 1564 and the second heater bar receiver 1565 are in the open state. Vice versa, when the second heater bar 1564 and the second heater bar receiver 1565 are closed, the first sealing mechanism 1510 can be moved from above the second sealing mechanism 1560 to below thereof, or from below to above the same while the first heater bar 1514 and the first heater bar receiver 1515 are in the open state.

With reference to the first cooling mechanism 1520 and the second cooling mechanism 1570, the operational condition can be similar to the above such that, by opening the second cooling bar 1574 and the second cooling bar receiver 1575 when the first cooling bar 1524 and the first cooling bar receiver 1525 are closed, or by closing the second cooling bar 1574 and the second cooling bar receiver 1575 when the first cooling bar 1524 and the first cooling bar receiver 1525 are open, the positional relation of the sealing mechanisms in the vertical direction can be changed optionally.

Next, a filling-packing operation of the forming, filling and sealing machine of the present embodiment will be described.

First, in FIG. 12 and FIG. 13, while keeping squeezing rollers 117 open, filling materials are injected from injection pipe 114 inside film 101 and feed rollers 116 are rotated concurrently to carry film 101 downwardly. At this time, two ridge portions 1c (refer to FIG. 15) have already been made in film 101 by folding mechanism 130 and further, the portion of film 101 into which filling material is supplied is also already heat sealed by means of top sealing mechanism 120 and bottom sealing mechanism 140.

When film 101 has been carried by a predetermined distance, squeezing rollers 117 are closed to divide the filling material. In this state, when feed rollers 116 and squeezing rollers 117 are further rotated to carry film 101 downwardly, unfilled portion 101d containing no filling material is formed in film 101. By cutting off this unfilled portion 110d by end sealing apparatus 150, standing pouch 1000 (refer to FIG. 9) is manufactured for containing the filling material hermetically sealed. Description will be made below with reference to the operation of the end sealing apparatus 150 for manufacturing the bag referring to FIGS. 20a to 20k.

In FIGS. 20a to 20k, for clear plain explanation, a mesh pattern is applied to the mechanisms related with the second unit 1551. Further, each motion illustrated in FIGS. 20a to 20k represents an operation of every 0.1 second.

In the state shown in FIG. 20a, the second sealing mechanism 1560 is at the highest position, and the first sealing mechanism 1510 is positioned below the second sealing mechanism 1560 being separated by a pitch equal to the width of the standing pouch to be manufactured. Also, the first cooling mechanism 1520 is positioned below the first sealing mechanism 1510 separated by the same pitch, and the second cooling mechanism 1570 is positioned between the first sealing mechanism 1510 and the first cooling mechanism 1520. At this time, the first heater bar 1514 and the first heater bar receiver 1515 are closed to heat seal film 101. Further, the first cooling bar 1524 and the first cooling bar receiver 1525 are also closed to hold film 1 below the first sealing mechanism 1510.

Here, it is noted that the portion of film 101 held by the first cooling bar 1524 and the first cooling bar receiver 1525 is the portion heat sealed by the second sealing mechanism 1560 at the previous motion one cycle before in the series of cycles shown in FIGS. 20a to 20k.

In this way, while heat sealing film 101 by the first sealing mechanism 1510 and holding film 101 by the first cooling mechanism 1520, the end sealing apparatus feeds film 101 downwardly, and moves the first sealing mechanism 1510 and first cooling mechanism 1520 in downward synchronization with the film feed speed, stops the feed of film 101 when the vertical pitch between the second sealing mechanism 1560 and the first sealing mechanism 1510 reaches P, as shown in FIG. 20a, and at the same time stops the downward movement of the first sealing mechanism 1510 and the first cooling mechanism 1520.

Successively, as shown in FIG. 20b, the second heater bar 1564 and the second heater bar receiver 1565 are closed to commence the heat sealing of unfilled portion 101d of film 101. When the second heater bar 1564 and the second heater bar receiver 1565 are closed, as shown in FIG. 20c, the first heater bar 1514 and the first heater bar receiver 1515 are opened, then as shown in FIG. 20d, immediately the first sealing mechanism 1510 and the second cooling mechanism 1570 are raised. Also at this point, squeezing rollers 117 are opened to drop the filling material held by squeezing rollers 117 to the point above the second sealing mechanism 1520.

When the position of the second cooling mechanism 1570 becomes the same height as the position of side heat seal portion 105 of film 101 heat sealed by the first sealing mechanism 1510, as shown in FIG. 20e, the second cooling bar 1574 and the second cooling bar receiver 1575 of the second cooling mechanism 1570 are closed, thereby commencing cooling of the side seal portion 105 heat sealed by the first sealing mechanism 1510. On the other hand, below the second cooling mechanism 1570, cutter 530 (refer to FIG. 19) of the first cooling mechanism 1520 is projected to cut off the portion heat sealed in the motion one cycle before.

As described above referring to FIGS. 20a to 20e, when the first sealing mechanism 1510 and the second cooling mechanism 1570 are changed in position for cooling the heat sealed portion, the feed of film 101 is stopped. Accordingly, the position of the portion on film 101 to be pressed by the second cooling mechanism 1570 can easily be controlled, and hence the second cooling mechanism 1570 can press the portion pressed by the first sealing mechanism 1510 accurately to perform certain cooling of the portion.

When film 101 is cut off by the first cooling mechanism 1520, as shown in FIG. 20f, the first cooling bar 1524 and the first cooling bar receiver 1525 of the first cooling mechanism 1520 are opened to drop the standing pouch 1000 obtained. At this time, squeezing rollers 117 are closed to divide the filling material and concurrently the first sealing mechanism 1510 is activated to ascend.

Next, as shown in FIGS. 20g to 20k, film 101 is carried downward with squeezing rollers 117 closed, and the second sealing mechanism 1560 and the second cooling mechanism 1570 are made to descend in synchronization with the film carrying speed. During this time, heat sealing operation by the second sealing mechanism 1560 and cooling operation by the second cooling mechanism 1570 are continuously performed. Further, together with the above, the first sealing mechanism 1510 and the first cooling mechanism 1520 are raised. When it becomes the state shown in FIG. 20h, that is, the state in which the positions of the first sealing mechanism 1510 and the second sealing mechanism 1560, the positions of the first cooling mechanism 1520 and the second cooling mechanism 1570 are substituted for each, compared with FIG. 20a, the feed of film 101 is stopped.

Thereafter, by replacing the motion of the first sealing mechanism 1510 with that of the second sealing mechanism 1560, the motion of the first cooling mechanism 1520 with that of the second cooling mechanism 1570 and repeating the above processes, standing pouches 1000 are produced successively. As described above, each process shown in FIGS. 20a to 20k represents a stage of 0.1 second. Therefore, in the present embodiment, each standing pouch 1000 is manufactured for every 1 second as a cycle.

On the other hand, the heat sealing operations on both sides of the standing pouch, as described above, are performed by using end sealing apparatus 150 having two sealing mechanisms 1510, 1560 and two cooling mechanisms 1520, 1570, that is, while carrying film 101 downwardly, the heat sealing operations are performed by using sealing mechanisms 1510 and 1560 alternately, and thereafter cooling operations are performed by using cooling mechanisms 1520 and 1570 alternately. Moreover, while film 101 is being carried, heat sealing of film 101 and cooling of the portion heat sealed by the previous motion are concurrently performed, and further the heat sealing mechanism not working and the cooling mechanism not cooling are carried upward for the next performance.

With the above procedure, it becomes possible to start the next heat sealing operation immediately after the present heat sealing operation is finished or before it is finished, and together with which the cooling of the heat sealed portion can be commenced just after the present heat sealing operation is finished. Therefore, with this system, it becomes possible to produce and fill the standing pouch 1000 at a high speed while assuring the necessary time for certain heat sealing and cooling of film 101, without deteriorating productivity. Further, since film 101 is cooled immediately after the heat sealing is finished, each process of heat sealing, cooling and cutting of film 101 can be performed efficiently, and the operating speed itself can be increased for all the processes from heat sealing to cutting, while augmenting the heat seal strength.

As described above, since heat sealing is performed by means of heat sealing mechanism 1510, 1560 while moving heat sealing mechanism 1510, 1560 downward together with film 101, generally this moving time is used as the heat sealing time. Here, in the present embodiment, when cooling the portion heat sealed, for certain cooling the heat sealed portion, the film feed is stopped and then sealing mechanisms 1510, 1560 and cooling mechanisms 1520, 1570 are substisuted, respectively, and moreover, the heat sealing is commenced by another sealing mechanism before the substitution of sealing mechanisms 1510, 1560 and cooling mechanisms 1520, 1570. Therefore, in addition to the time for carrying film 101, the film feed stopping time can be used as the heat sealing time.

Further, the circumstances are similar in the cooling operation. End sealing apparatus 150 of the present embodiment comprises two sets of cooling mechanisms 1520, 1570, and the feed time of film 101 as well as the feed stop time of film 101 can be used as the cooling time to be performed by cooling mechanisms 1520, 1570.

For example, in case of manufacturing one standing pouch 1000 per second as in this embodiment, a time a little longer than 1 cycle time (1 second) can be used in practice. Concretely, about 1.2 seconds can be used as the heat sealing time.

As a result, since a sufficient time is allotted to the heat sealing time for sealing mechanisms 1510, 1560 and the cooling time for cooling mechanisms 1520, 1570, more certain heat sealing can be realized. Particularly, in case of manufacturing standing pouch 1000 as in the present embodiment, since it is required to heat seal the overlapped portion in film 1, at the maximum four sheets of film 1, end sealing apparatus 150 as above is considered adaptable as the end sealing apparatus to be used in the forming, filling and sealing machine for manufacturing standing pouch 1000.

As shown in FIGS. 20b to 20e, for cooling the heat sealed portion, for example, when the first sealing mechanism 1510 is replaced by the second cooling mechanism 1570, film 1 is supported above or below side seal portion 105 sealed by the first sealing mechanism 1510, by means of the second sealing mechanism 1560 and the first cooling mechanism 1520, respectively. Therefore, the second cooling mechanism 1570 can accurately pressurize side seal portion 105 heat sealed by the first sealing mechanism 1510, without deviating from the portion.

Figure 21:
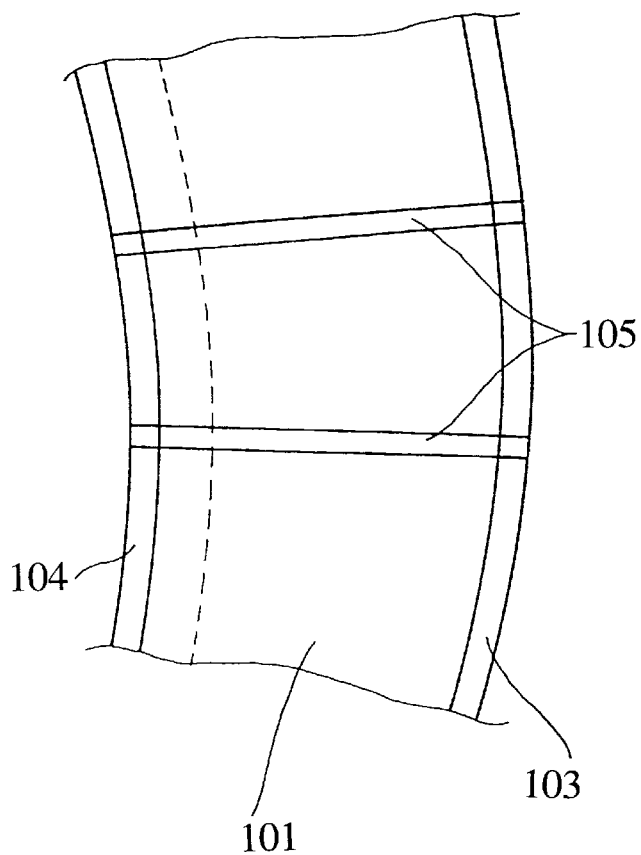
FIG. 21 is a view for explaining an arch appearing in the film when the bag making-filling operation is successively performed without the film by being cut the cooling mechanism.

In standing pouch 1000 manufactured by the forming, filling and sealing machine of the present embodiment, as shown in FIGS. 20a to 20k, there is filling material of two bag quantity or three bag quantity existing below squeezing rollers 117. Also, as shown in FIG. 21, in film 101 before it is cut, the bottom seal portion 104 side to be heat sealed by bottom sealing mechanism 140 (refer to FIG. 12) is expanded compared to top seal portion 103 to be sealed by top sealing mechanism 120 (refer to FIG. 12), displaying a bow shape under natural conditions.

Therefore, side sealed portions 105 are not parallel to each other, and hence if the upper and lower parts of the portion heat sealed by the first sealing mechanism 1510 are not held, the position of side seal portion 105 may move somewhat when the first sealing mechanism 1510 leaves film 101. In other words, being affected by the deviated position of film 101 itself, sometimes an error occurs that the second cooling mechanism 1570 cannot press side seal portion 105 accurately. In such a case, the second cooling mechanism 1570 cuts side seal portion 105 in that state. If the second cooling mechanism 1570 cuts the film at the deviated position, the portion other than the side seal portion 105 may be cut in the worst case, and filling material will leak out.

Therefore, as in the present embodiment, when sealing mechanism 1510, 1560 and cooling mechanism 1520, 1570 are correspondingly reversed, it is effective to hold the upper and lower parts thereof for preventing the cutting position from deviating.

Further in the present embodiment, the operation is performed such that squeezing rollers 117 are opened while keeping heat sealing mechanisms 1510, 1560 disposed above in the closed state; filling materials are dropped into the space above the heat sealing mechanisms 1510, 1560; film 101 is carried downward in that state; squeezing rollers 117 are closed to form unfilled potion 101d in film 101 and thereafter; this unfilled portion 101d is heat sealed by means of the other one of heat sealing mechanisms 1560, 1510. According to this process, during the time from dividing filling material to heat sealing unfilled portion 101d of film 101, film 101 always receives only the weight of filling material for one bag. As a result, since no extra weight is loaded on film 101, a standing pouch 1000 of good tension can be obtained.

By the way, produced standing pouches 1000 are shipped packed in a box by several dozens or several tens of bags as a unit. However, as shown in FIG. 9, since standing pouch 1000 has a bulge in the bottom 1001a for thereby making it stand by itself, arranging these bags parallel in a box is not easy.

Figure 22:
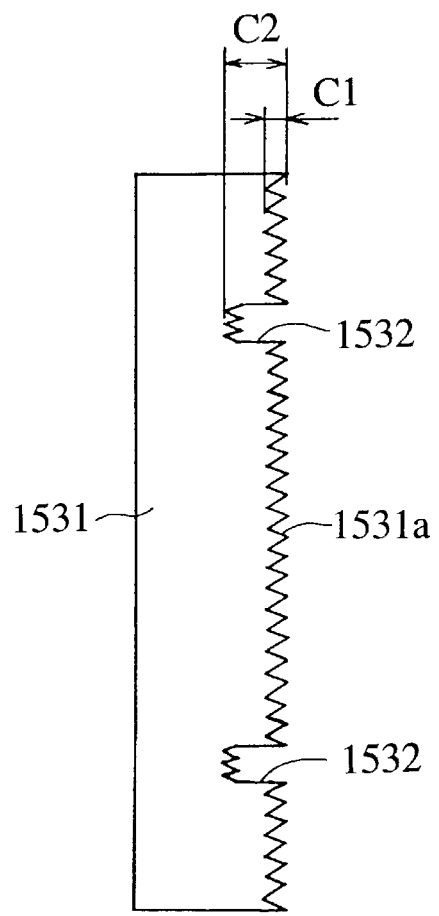
FIG. 22 is a plan view of another example showing a form of a cutter used in the cooling mechanism illustrated in FIG. 16.

For making it possible to arrange standing pouch 1000 easily, it is preferable to use cutter 1531, as shown in FIG. 22, in each cooling mechanism 1520 and 1570.

Cutter 1531 shown in FIG. 22 has a plurality of concaves of 2–3 mm wide on one side, the edge 1531a being formed on the side of concaves 1532 including the inside thereof. For cutting the film with this structure, cutter 1531 is protruded by a distance C1 by which edge 1531a inside concave 1532 remains spaced from the film, then the film is cut only at a portion other than concave 1532, and when cutter 1531 is further protruded by a distance C2 which makes the edge 1531a of concave 1532 cut, the film is completely cut off.

Figure 23:
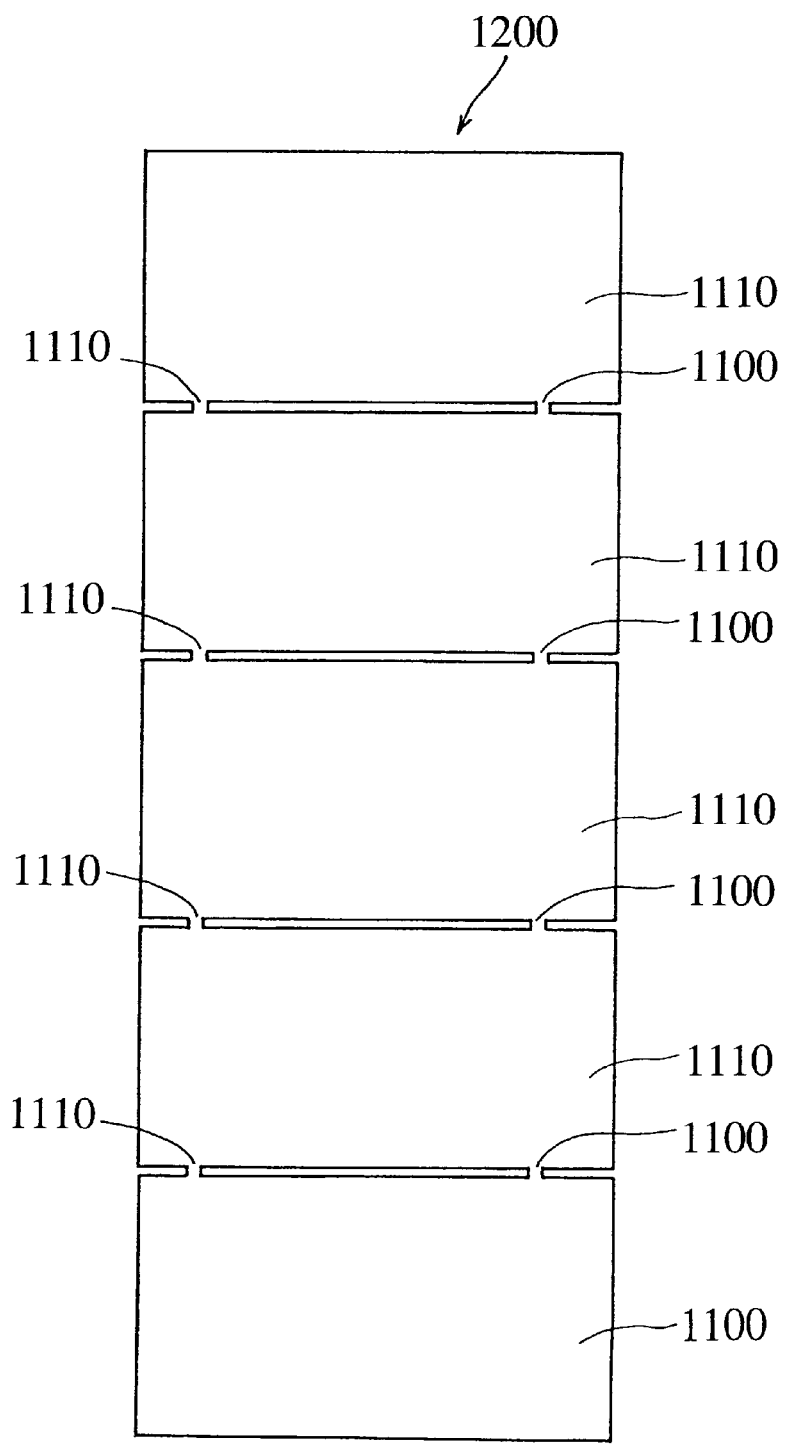
FIG. 23 is a view of five consecutive packages obtained by using the cutter shown in FIG. 22.

Providing each of the first cooling mechanism 1520 and the second cooling mechanism 1570 with this type of cutter 1531, generally film 101 is cut with the protruding distance C1, and the film for every five runs thereof is cut by arranging the projection distance as C2. Then as shown in FIG. 23, five series pack 1200 is obtained including five standing pouches 1100 connected in parallel by connections 1100. By connecting standing pouches 1100 into a five series pack 1200 in this way, in case of packing, the time for arranging standing pouches 1100 one by one in the box can be saved, thereby simplifying the packing operation.

On the other hand, when standing pouch 1100 of this style is displayed in a shop, each standing pouch 1100 can be displayed being cut off at each connection 1110. The width of connection 1110 is made corresponding to the width of concave 1532 of cutter 1531, and as described above, since the width of concave 1532 is 2–3 mm, connection 1110 can be cut off easily. Here, although explanation has been made concerning five series pack 1200, as example, in which each standing pouch 1100 is connected by two connections 1110, the number of connections 1110 and the number of standing pouches 1100 can optionally be determined according to the material of the film used, to the size of standing pouch 1100 and the size of the packing box.

Third Embodiment

The first and second embodiments described above have shown forming, filling and sealing machines for manufacturing a standing pouch, based on the operation of a vertical type forming, filling and forming machine, efficiently without introducing in any foreign matter.

As is clear from the above embodiments, the standing pouch has a thick bottom and the degree of swelling of the bag is different according to portions. Therefore, when the film is heat sealed, when compared to the case for manufacturing a pillow type package, wrinkles tend to generate in the film. When this wrinkle is generated, it not only deteriorates the outward appearance of the package but good sealing property is also lost, and according to circumstances, filling materials may leak from that portion.

Figure 24:
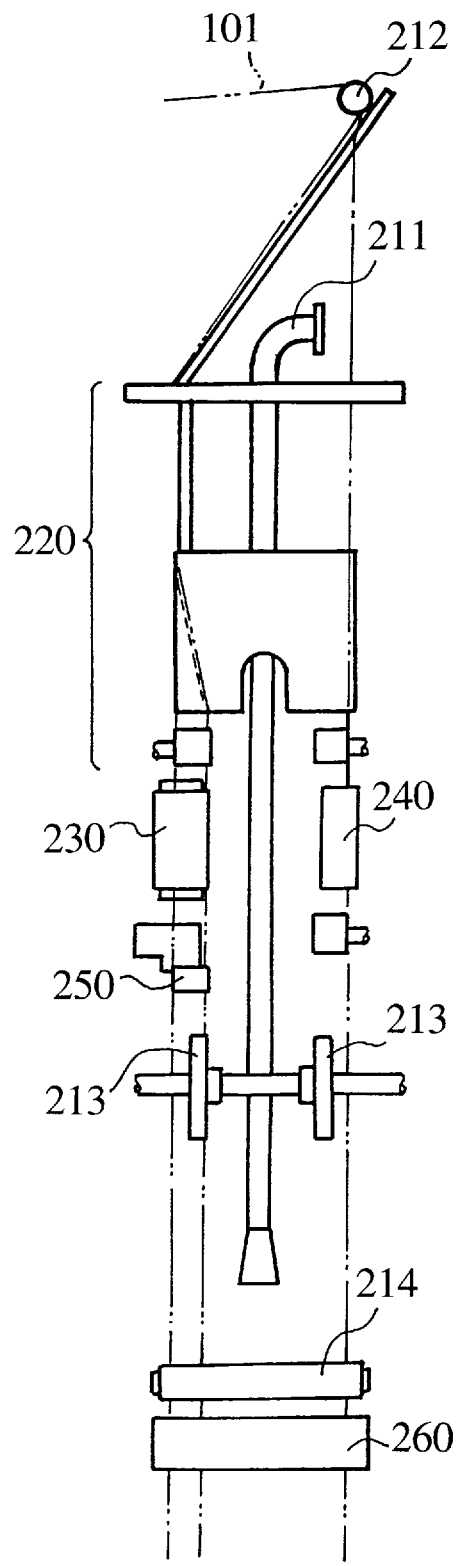
FIG. 24 is an elevation of a forming, filling and sealing machine according to a third embodiment of the present invention.
Figure 25:
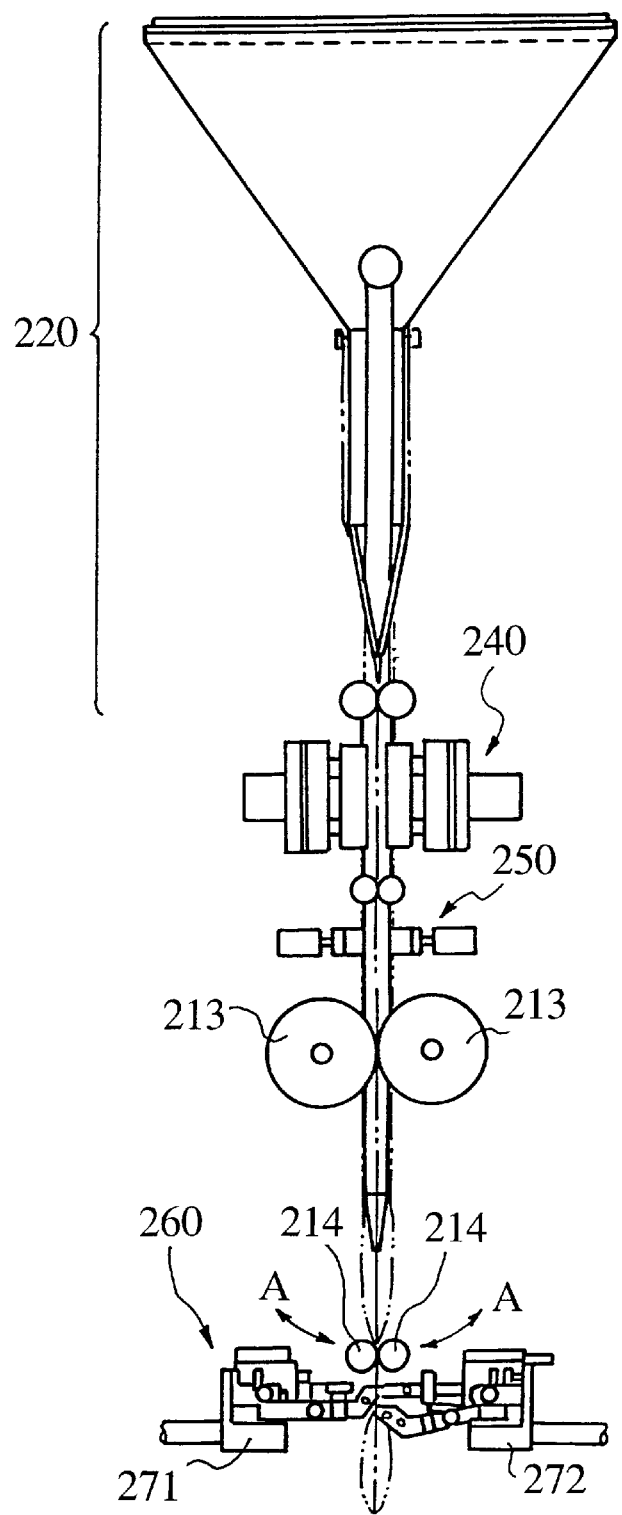
FIG. 25 is a side elevation of the forming, filling and sealing machine shown in FIG. 24.
Figure 34:
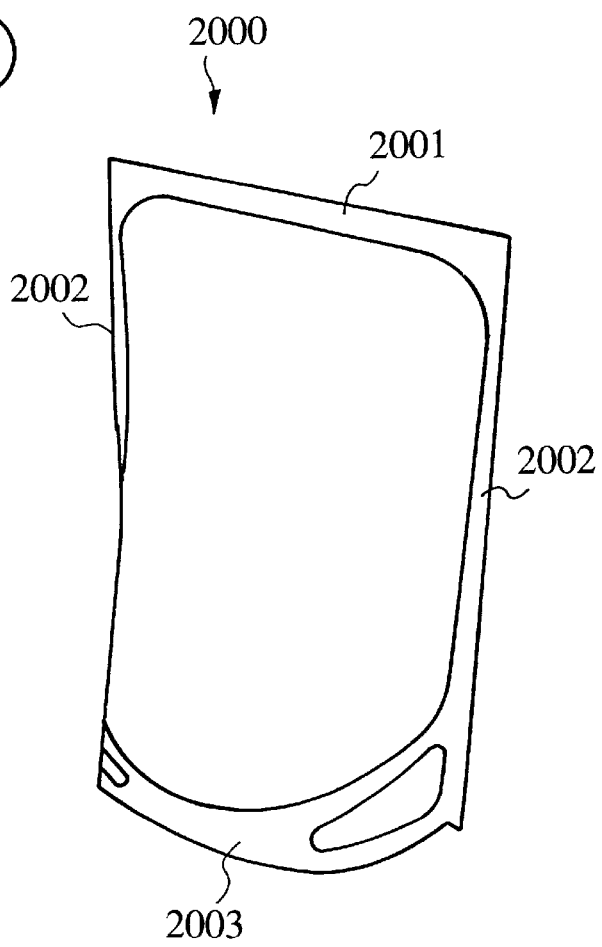
FIG. 34 is a perspective view of the standing pouch manufactured by the forming, filling and sealing machine shown in FIG. 24 and FIG. 25.

Therefore, by making the film wrinkle-resistant, the present embodiment provides a filling-packing machine which can perform better heat sealing while making use of the advantages of the vertical type filling-packing machine, A forming, filling and sealing machine according to the present embodiment manufactures standing pouch 2000, as shown in FIG. 34, having top seal portion 2001, side seal portion 2002 and bottom seal portion 2003. First, the approximate constitution of the forming, filling and sealing machine according to the present embodiment will be described with reference to FIG. 24 and FIG. 25.

Around the top of injection pipe 211, film forming-folding mechanism 220 is provided for folding sheet film 101 supplied from film supply roller (not shown) by way of guide roller 212, in such a manner to make both side ends coincide and inwardly fold the portion which serves as a bottom of standing pouch 2000.

Below film forming-folding mechanism 220, there are provided bottom sealing mechanism 230 and top sealing mechanism 240 for heat sealing film 101 along the longitudinal direction of the film, film 101 being folded into a fixed form by film forming-folding mechanism 220. Bottom sealing mechanism 230 and top sealing mechanism 240 are disposed in opposite positions, with injection pipe 211 therebetween. Bottom sealing mechanism 230 forms bottom seal portion 2003 (refer to FIG. 34) of standing pouch 2000, while top sealing mechanism 240 forms top seal portion 2001 (refer to FIG. 34).

Below bottom sealing mechanism 230, reinforcement sealing mechanism 250 for reinforcing the part of the portion heat sealed by bottom sealing mechanism 230 is provided, and further below, two pairs of feed rollers 213 are provided for carrying film 101 downward. Below feed rollers 213, a pair of squeezing rollers 214 to be rotated in synchronization with the rotation of feed rollers 213 are provided. Feed rollers 213 and squeezing roller 214 are each similar to those of the first embodiment and the second embodiment.

It is noted that the bottom of injection pipe 211 is positioned above squeezing rollers 214 and below reinforcement sealing mechanism 250. Therefore, since filling materials inputted through injection pipe 211 are supplied at the point below reinforcement sealing mechanism 250, reinforcement sealing mechanism 250 is kept free of filling materials, and hence reinforcement sealing mechanism 250 can perform heat sealing work satisfactorily.

Below squeezing rollers 214, end sealing mechanism 260 is disposed for laterally (in the horizontal direction) heat sealing film 201 supplied with filling materials for forming side seal portion 2002 (refer to FIG. 34) of standing pouch 2000.

Next, film forming-folding mechanism 220, bottom sealing mechanism 230, top sealing mechanism 240, and reinforcement sealing mechanism 50 described above will be described in detail. It is noted that end sealing mechanism 260 has the same mechanism as that of end sealing mechanism 50 (refer to FIG. 7) shown in the first embodiment, the detailed description will be omitted.

Film forming-folding mechanism 220 will be described with reference to FIG. 26.

Figure 26:
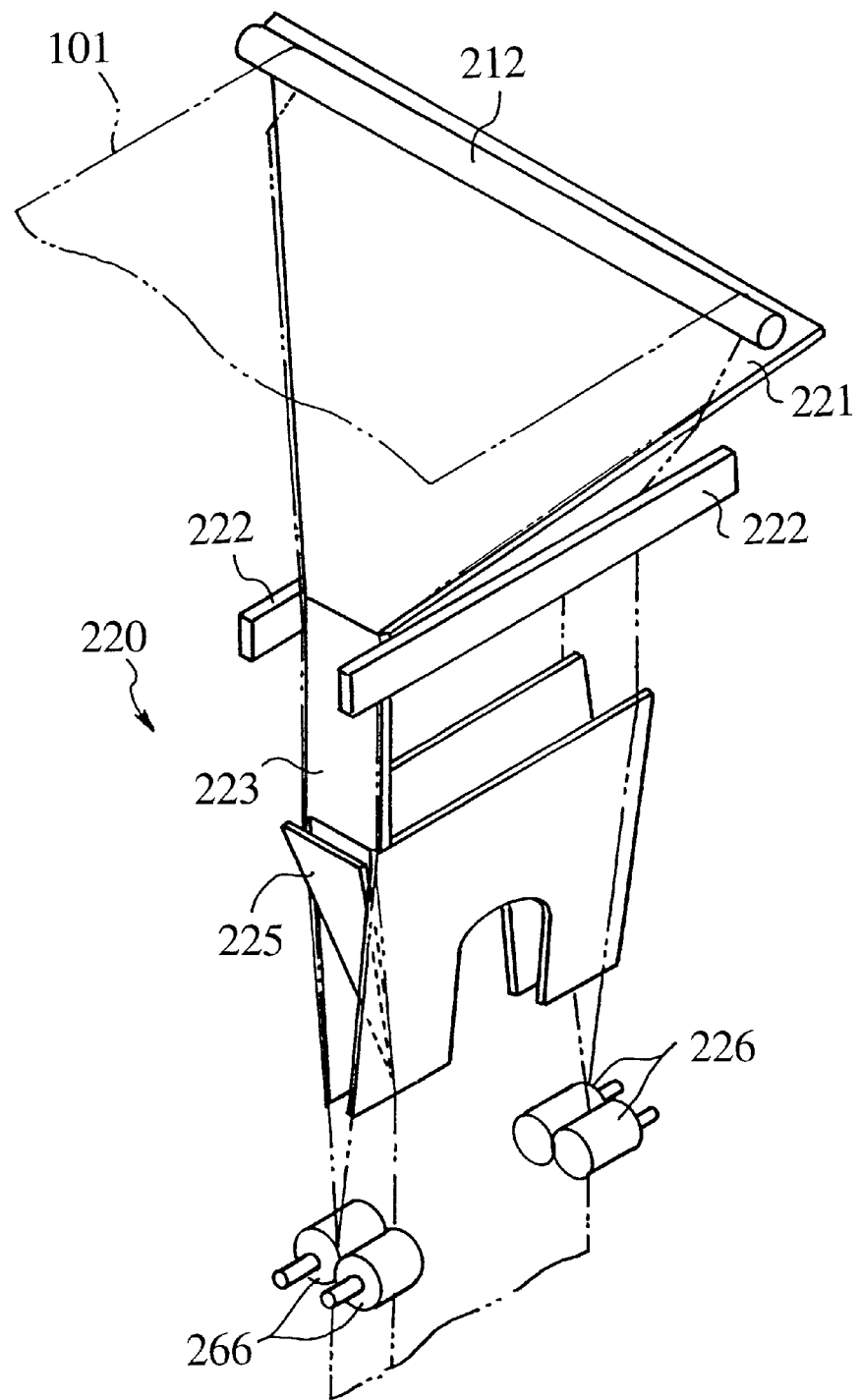
FIG. 26 is a perspective view of the bag making folding mechanism shown in FIG. 24 and FIG. 25.

As shown in FIG. 26, trapezoid plate 221 whose top side is longer than the bottom side but shorter than the width of film 101 and whose two oblique sides have equal angles is arranged below guide roller 212 obliquely to the perpendicular direction. In the vicinity of the bottom side of trapezoid plate 221, width regulation plate 223 of a rectangular form having a width equal to the length of the bottom side of trapezoid plate 221 is disposed in the perpendicular direction. On both sides of width regulation plate 223, two guide arms 222 are provided extending in the horizontal direction and in the direction perpendicular to the width direction of width regulation plate 223.

Film 101 passing guide roller 212 is carried downwards by the drive of feed roller 213 (refer to FIG. 24 and FIG. 25) keeping close contact with the top surface of trapezoid plate 221 and the outside surface of width regulation plate 223, and further the extension of the end of film 101 is restrained from outside of film 101 by each guide arm 222. Through this process, two edges 101a are formed in film 101 as shown in FIG. 14, thereby forming film 101 into a flume shape. The region between these edges 101a becomes the bottom surface of the standing pouch.

Below width regulation plate 223, a push plate 225 and two check plates 224 are disposed for further inwardly folding the region between two edges 101a formed in film 101. Push plate 225 is an inverted triangle member and obliquely disposed in such a manner to push in the region between two edges 101a of film 101 shown in FIG. 14 from the outside of film 101. Each check plate 224 is provided for holding two edges 101a from the inside of film 101 for controlling so that each edge 101a is not pushed in when film 101 is pushed in by push plate 225. Each check plate 224 is oppositely disposed inside film 101 and spaced from each other. With this structure, film 101 passing push plate 225 and each check plate 224 is, as shown in FIG. 15, folded at the side opposite to the open end into a letter W shape, and resultantly two ridge portions 101b and a valley between two ridge portions 101b are formed.

Check plates 224 have a space therebetween, at the top, equal to the width of regulation plate 223 and obliquely disposed, respectively, downwards with the mutual space gradually decreasing corresponding to the inclination of the oblique side of push plate 225. Film 101 passing push plate 225 and each check plate 224 is carried downwards, both sides held by press rollers 226.

As described above, film 101 passes the surface of trapezoid plate 221 is bent by the two oblique sides and the bottom side of trapezoid plate 221, and carried downwards. At this time, since the two oblique sides stand with equal angles against the center line of trapezoid plate 221, the position of film 101 is self adjusted so that the load on each oblique side becomes equal, thereby preventing a position error of film 101 in the width direction. Further, when forming the ridge portion which becomes bottom seal portion 2003 (refer to FIG. 34), since edge 101a which is the top of ridge portion 101b is formed by means of trapezoid plate 221 and width regulation plate 223, the position of each ridge portion 101b will never deviate. In other words, the positions of two ridge portions coincide with each other and the distances between each ridge portion 101b and the end of film 101 in the width direction also coincide with each other.

Since film 101 is carried stably without meandering and the two ridge portions 101b are reliably formed at the fixed positions, it is possible to stabilize the heat sealing position of top sealing mechanism 240 and bottom sealing mechanism 230. Moreover, since positional deviation in the width direction of film 101 is prevented, wrinkles are not produced in film 101 even when squeezing is performed by squeezing rollers 214. Thus, it is possible to realize good heat sealing by end sealing mechanism 260.

Also, since the middle part of each edge 101a is inwardly folded after forming two edges 101a in film 101 by means of width regulation plate 223, the length of film 101 required to be fed for folding sheet film 101 into a shape shown in FIG. 15 can be shortened, and the height of the forming, filling and sealing machine can be controlled to that extent.

Now, bottom sealing mechanism 230 will be described with reference to FIG. 27 and FIG. 28.

Figure 27A:
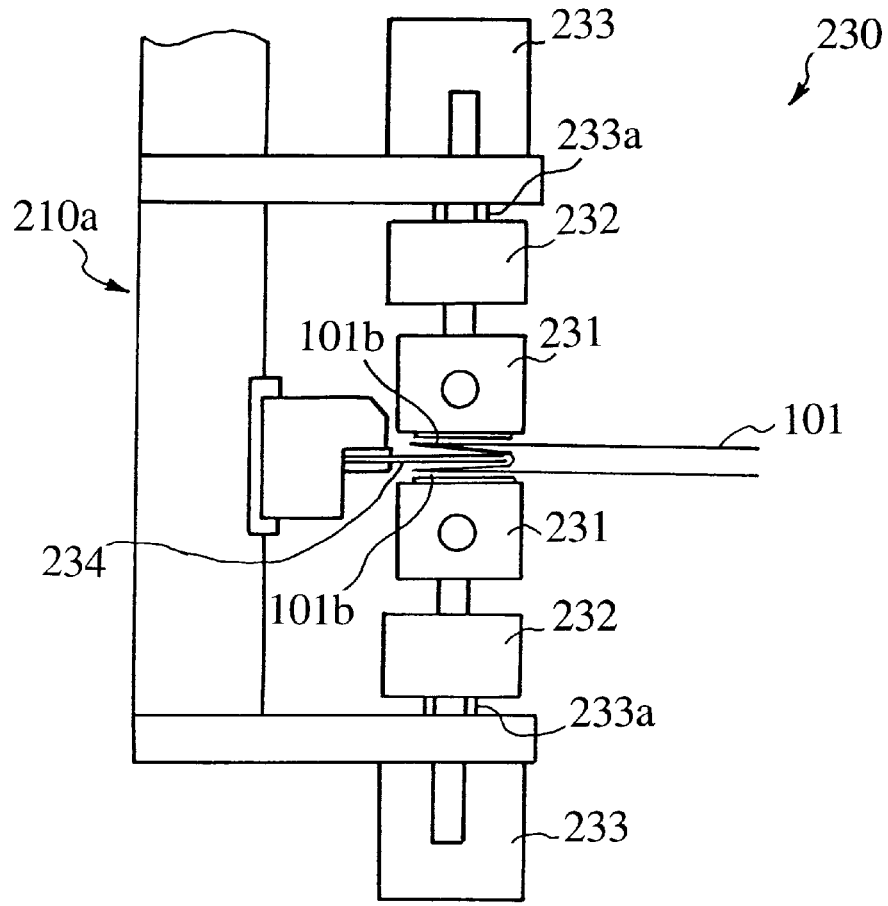
FIG. 27a is a top view of the bottom sealing mechanism shown in FIG. 24.
Figure 27B:
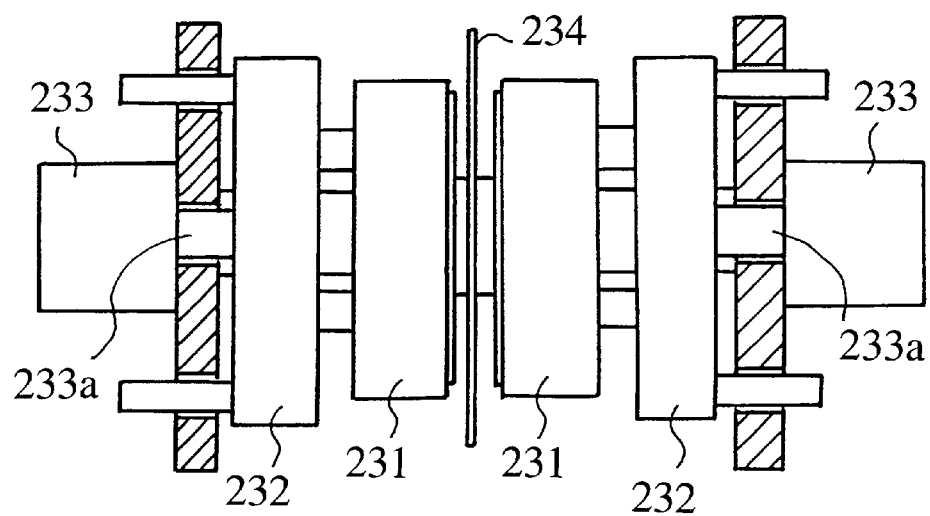
FIG. 27b is an elevation of the same bottom sealing mechanism.

As shown in FIG. 27, bottom sealing mechanism 230 is attached to frame 210a of the forming, filling and sealing machine, comprising two cylinders 233 fixed to frame 210a having rods 233a oppositely disposed to each other; two bottom seal bars 231 each supported by support member 232 fixed to rod 233a of each cylinder 233, the pressure surfaces of bottom seal bar 231 being oppositely disposed to each other; and receiving plate 234 supported by frame 210a, being disposed with the top thereof inserted between each bottom seal bar 231. The distance between each bottom seal bar 231 and receiving plate 234 is arranged so that bottom seal bar 231 can be pressed by receiving plate 234 by forwarding rod 233a of cylinder 233.

Film 101 folded by the above film forming-folding mechanism 220 (refer to FIG. 26) is carried in the state in which receiving plate 234 is inserted between two ridge portions 101b. Each bottom seal bar 231 has a built-in heater (not shown) such as an electric heater. By heating each bottom seal bar 231 by this heater, and concurrently driving each cylinder 233 to advance each bottom seal bar 231, the portions of film 101 held between receiving plate 234 and bottom seal bar 231, that is, two ridge portions 101b are heat sealed at the same time.

Figure 28:
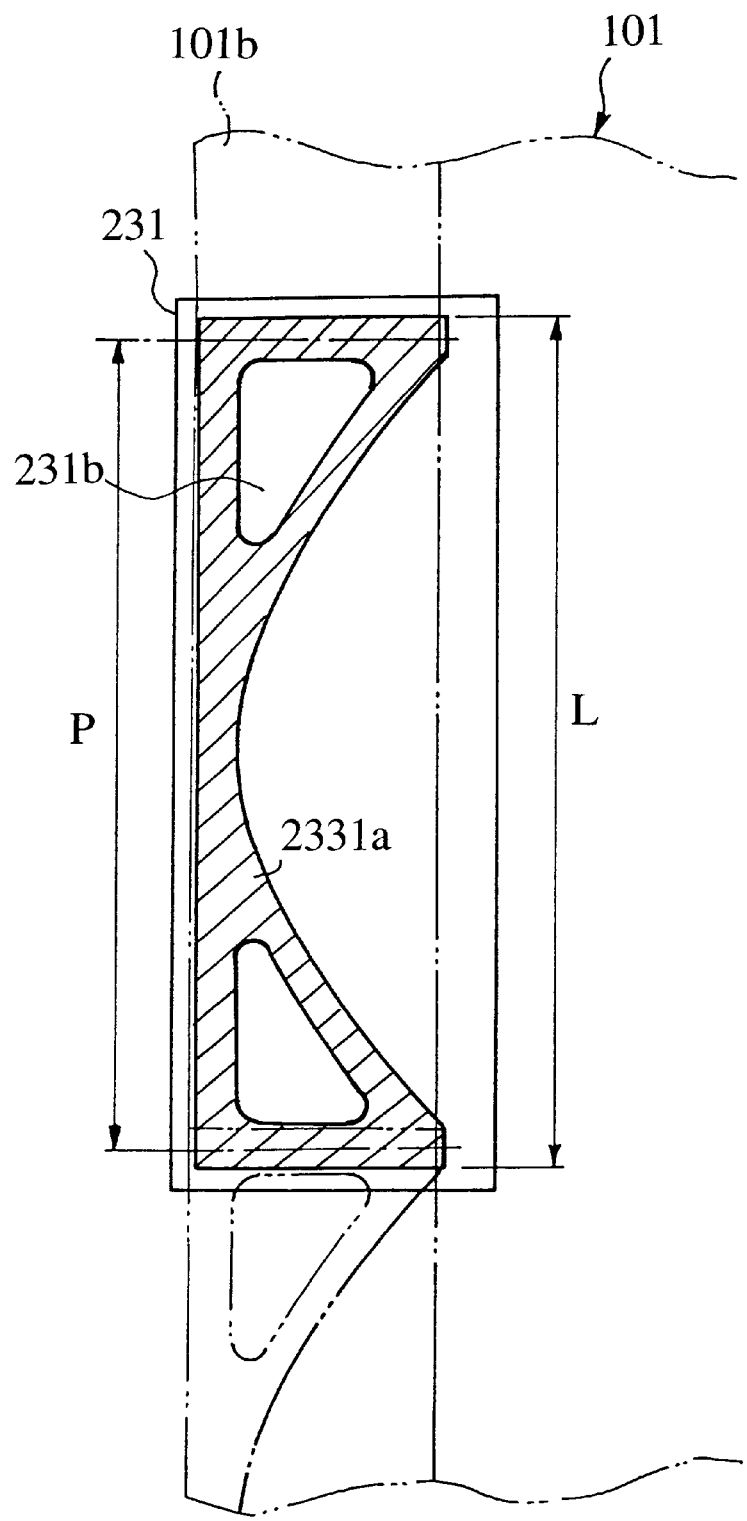
FIG. 28 is a view of a pressure surface of the bottom sealing bar shown in FIGS. 27a, 27b.

Here, the pressure surface of each bottom seal bar 231 has, as shown in FIG. 28, convex 231a made in the hatched region to be higher than the periphery, and when the pressure surface of bottom seal bar 231 is pressed on film 101, practically this convex 231a is pressed on film 101. Depending on the configuration of this convex 231a, the form of the rib for making bottom seal portion 2003 (refer to FIG. 34) of standing pouch 2000, that is, the stability of standing pouch 2000 to stand is determined. In bottom seal portion 2003 of the present embodiment, the boundary between the region to be heat sealed and the region for receiving filling materials makes a concave curve, and the boundary between the above region to be heat sealed and the portion to be heat sealed by end sealing mechanism 260 is connected by a curve. Further, the length L of convex 231a in the perpendicular direction is made larger than the feed pitch P of film 101, and at the top and bottom ends of convex 231a, convex 231a has the maximum length in the horizontal direction so that bottom seal portion 2003 may overlap on both ends of side seal portion 2002 (refer to FIG. 34) of standing pouch 2000.

Further, in convex 231a, concave 231b which does not press the film when film 101 is heat sealed is formed enclosed by convex 231a, and together with which, convex 231a is provided at the position that the convex does not pressurize the inside top region 101c (refer to FIG. 15) of the fold which forms outside ridge portions 101b in film 101.

According to the above constitution, when film 101 is heat sealed by bottom sealing mechanism 230, film 101 is not heat sealed in the region corresponding to concave 231b of bottom seal bar 231 and in the region at the top of ridge portions 101b (refer to FIG. 15). Therefore, these regions become an escape (air reservoir) for air bubble generated in the heat sealing activity whereby no air bubbles remain in an heat sealed region, resulting in the appropriate heat sealing of good appearance.

Top sealing mechanism 240 will be described with reference to FIG. 29 and FIG. 30.

Figure 29A:
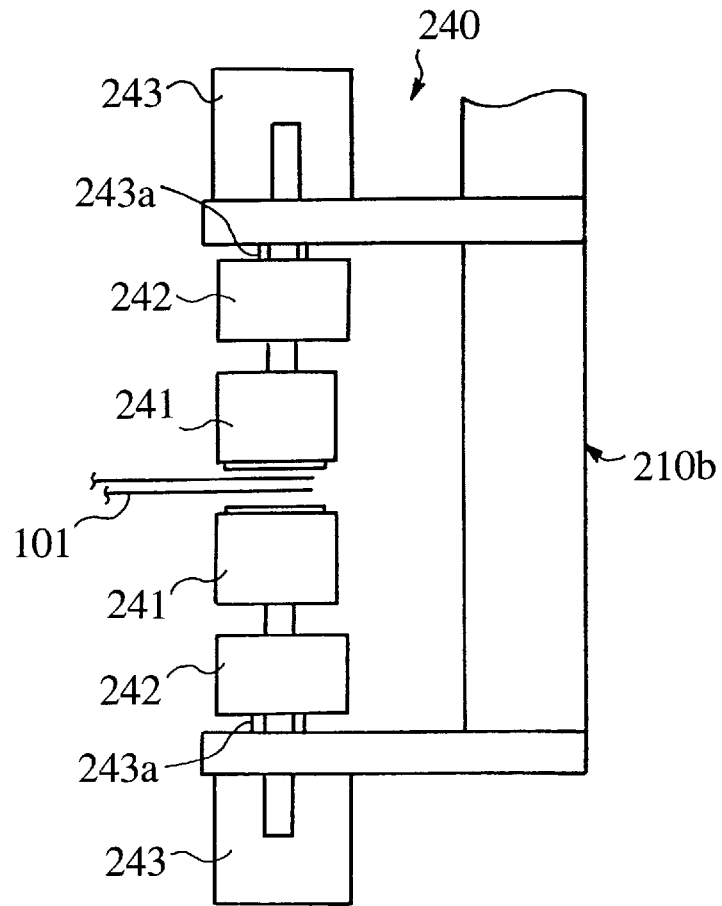
FIG. 29a is a top view of the top sealing mechanism shown in FIG. 24 and FIG. 25.
Figure 29B:
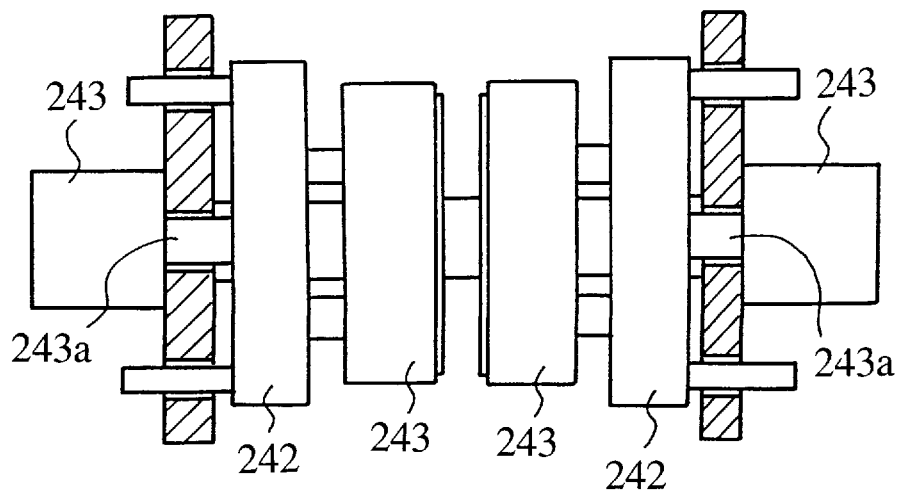
FIG. 29b is an elevation of the same top sealing mechanism.

As shown in FIG. 29, top sealing mechanism 240 comprises two cylinders 243 fixed to frame 210b having rods 243a oppositely disposed to each other, and two top seal bars 241 each supported by support member 242 fixed to rod 243a of each cylinder 243, the pressure surfaces of top seal bars 241 being oppositely disposed to each other to be capable of applying pressure, and are further structured so that the open end of film 101 folded by film forming-folding mechanism 220 (refer to FIG. 26) can pass through between each top seal bar 241.

Each top seal bar 241 incorporates heating means (not shown) such as an electric heater. While heating top seal bar 241 by this heater, and by concurrently driving each cylinder 243 for advancing each top seal bar 241, the open end of film 101 is heat sealed along the longitudinal direction, thereby forming film 101 into a tubular shape.

Figure 30:
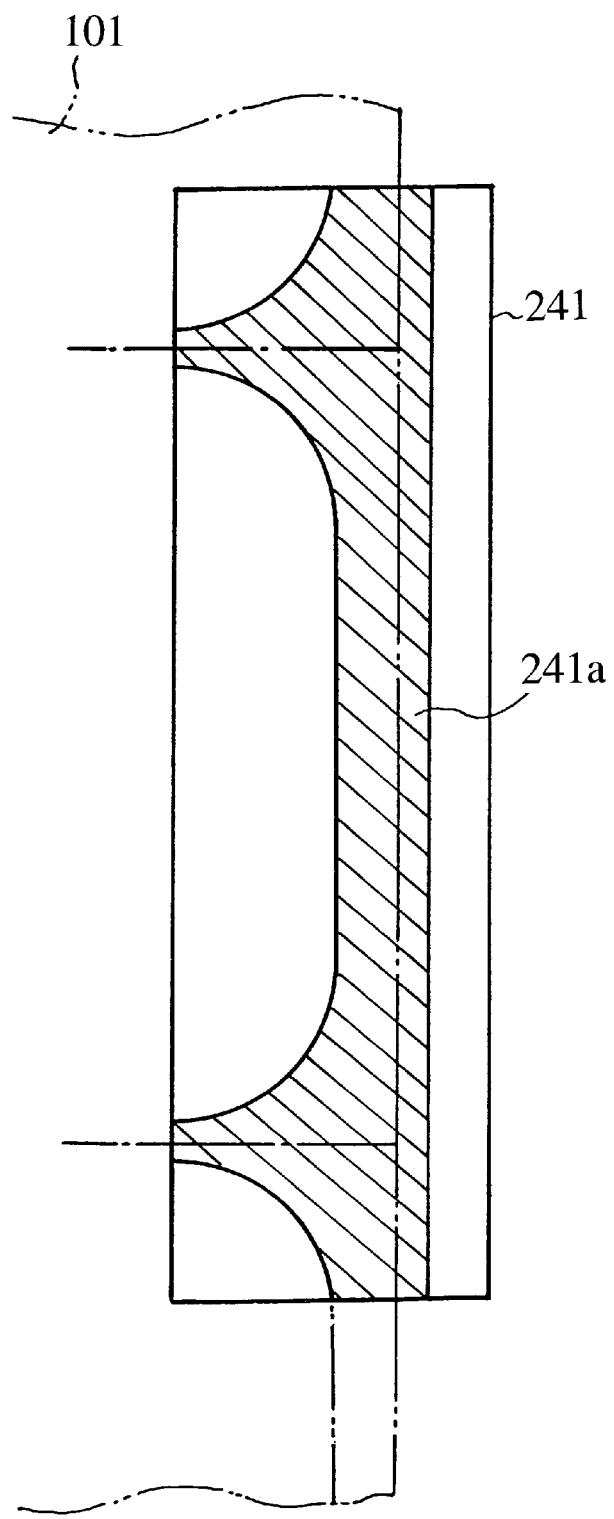
FIG. 30 is a view of a pressure surface of the top sealing bar shown in FIGS. 29a, 29b.

Here, the pressure surface of each top seal bar 241 has, as shown in FIG. 30, convex 241a made in the hatched region to be higher than the periphery, and when the pressure surface of top seal bar 241a is pressed on film 101, practically this convex 241a is pressed on film 101. Depending on the configuration of this convex 241a, the form of top seal portion 2001 (refer to FIG. 34) of standing pouch 2000 is determined. In the present embodiment, the boundary between the above region to be heat sealed and the portion to be heat sealed by end sealing mechanism 260 is connected by a curve.

Further, in the same way as the case of convex 231a of bottom seal bar 231 of bottom sealing mechanism 230 described above, the length of convex 241a of top seal bar 241 in the perpendicular direction is made larger than the feed pitch P of film 101, and at the top and bottom ends of convex 241a, convex 241a has the maximum length in the horizontal direction so that top seal portion 2001 may overlap on both ends of side seal portion 2002 (refer to FIG. 34) of standing pouch 2000.

Film 101 heat sealed by bottom sealing mechanism 230 and top sealing mechanism 240 is further heat sealed horizontally by end sealing mechanism 260 later described and cut off bag by bag. At this time, in the side seal portion heat sealed by end sealing mechanism 260, the portion at which film 101 has been folded by film forming-folding mechanism 220 has become quadruplicate. Although end sealing mechanism 260 employed in the present embodiment is capable of high strength heat sealing as described later, if excessive stripping force is applied, there is a possibility that exfoliation will occur in the heat sealed portion.

Therefore in the present embodiment, for maintaining sufficient heat seal strength of the quadruplicate portion of film 101, reinforcement sealing mechanism 250 is provided for heat sealing the quadruplicate portion of film 101, before applying end sealing mechanism 260 for heat sealing.

Now, description of this reinforcement sealing mechanism 250 will be made with reference to FIG. 31 and FIG. 32.

Figure 31A:
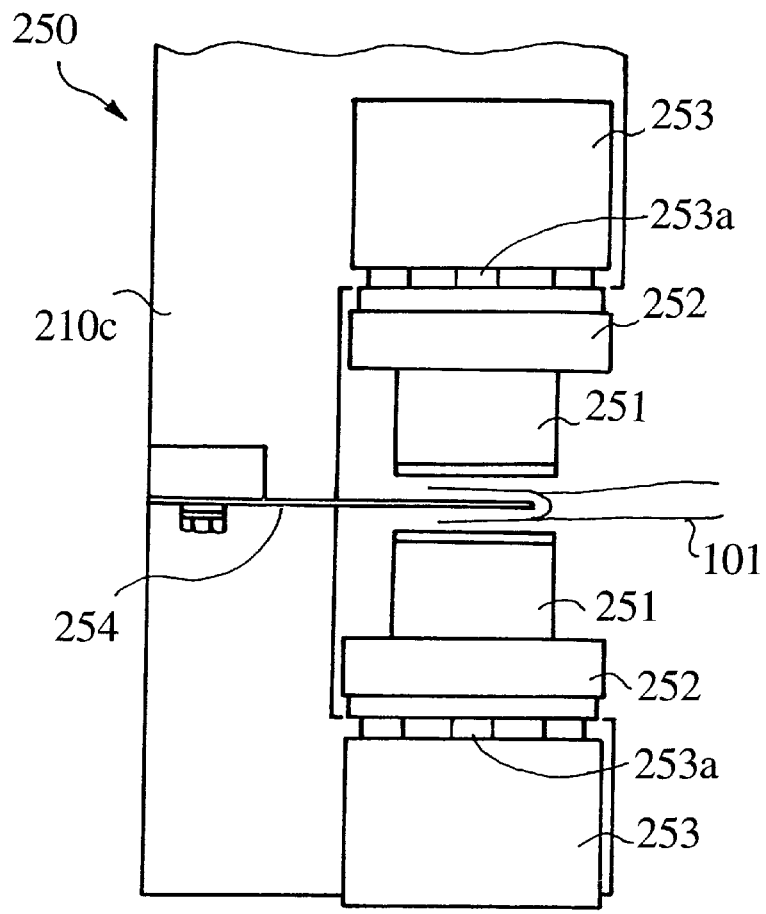
FIG. 31a is a top view of a reinforcement sealing mechanism shown in FIG. 24 and FIG. 25.
Figure 31B:
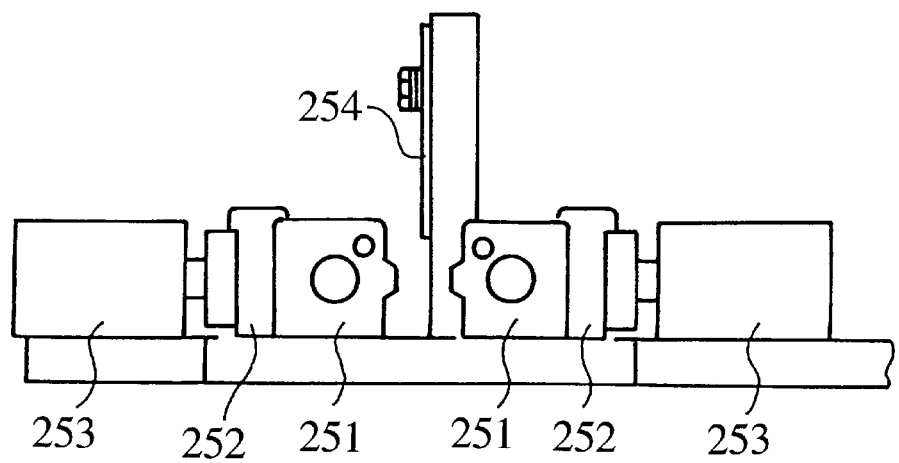
FIG. 31b is an elevation of the same reinforcement sealing mechanism.
Figure 32:
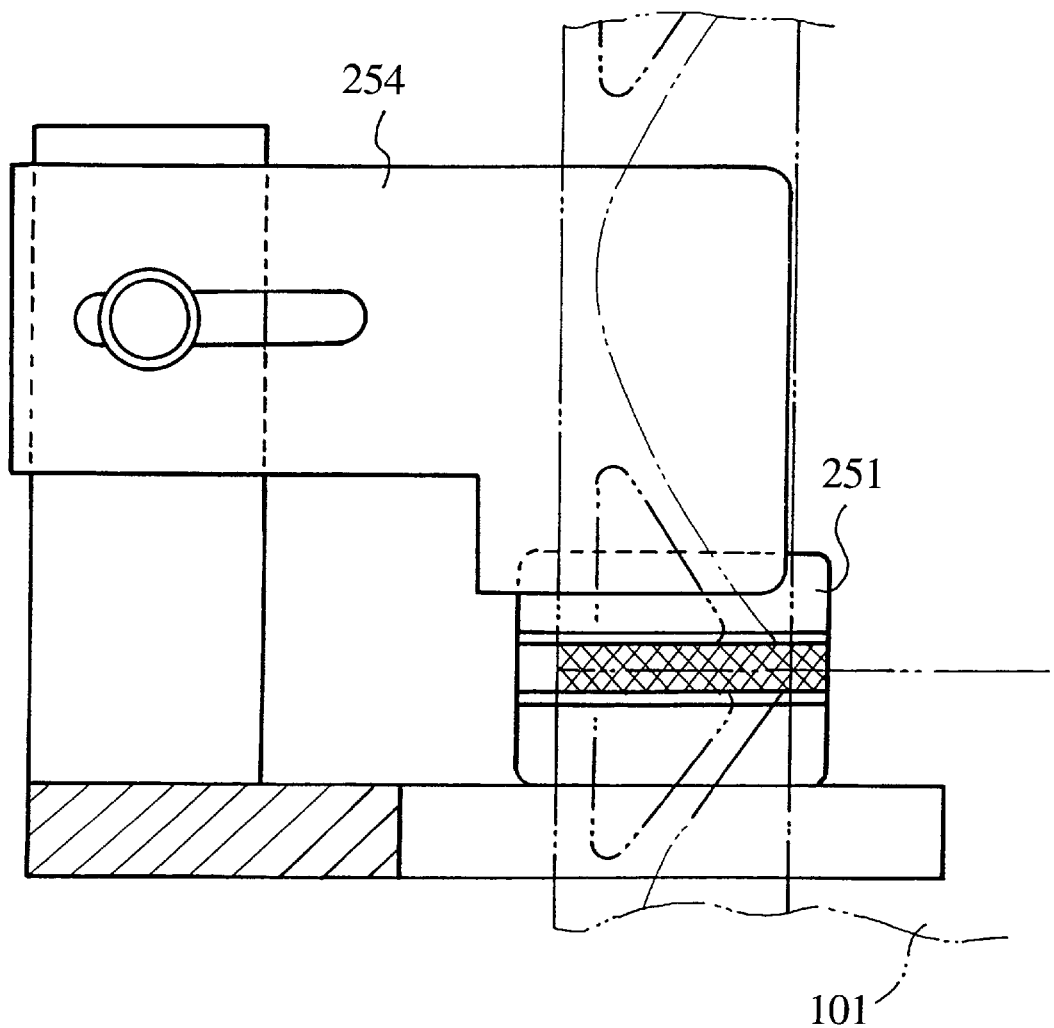
FIG. 32 is a side view showing the positional relationship between the reinforcement sealing bar and a film position regulating plate shown in FIGS. 31a, 31b.

As shown in FIG. 31, reinforcement sealing mechanism 250 comprises two cylinders 253 fixed to frame 210c having rods 253a oppositely disposed to each other, and two reinforcement seal bars 251 each supported by support member 252 fixed to rod 253a of each cylinder 253, the pressure surfaces of reinforcement seal bars 251 oppositely disposed to each other to be capable of applying pressure. Each reinforcement seal bar 251 incorporates heating means (not shown) such as an electric heater. Further, as shown in FIG. 32, these reinforcement seal bars 251 do not press folded film 101 over whole the region in the direction of width, but are made to a size for pressuring the quadruplicate portion into which film 101 is folded by the above film forming-folding mechanism 220. Therefore, while heating reinforcement seal bar 251 by heating means and by concurrently driving each cylinder 253 to advance each reinforcement seal bar 251, to the portion where becomes the side seal portion of the standing pouch, heat sealing is applied to the portion (portion with a mesh mark in FIG. 32) at which film 101 is quadruplicate. Further, above reinforcement seal bar 251, film position regulation plate 254 is provided being fixed to a position which makes film position regulation plate 254 enter between two ridge portions 101b of film 101 heat sealed by bottom sealing mechanism 230. Owing to this structure, the position of film 101 is stabilized, deviation of the seal position in the heat sealing to be performed by reinforcement sealing mechanism 250 is prevented, and melt bonding between bottom seals (film surface folded to a concave) caused by high temperature immediately after the heat sealing can also be prevented.

A filling-packing motion of the forming, filling and sealing machine of the present embodiment is similar to that of the first embodiment, and hence the detailed description is omitted, but description will be made below with reference to the particular effects of the present embodiment.

As described above, in order to arrange so that the portion heat sealed by bottom sealing mechanism 230 and the portion heat sealed by top sealing mechanism 240 can be connected to the portion heat sealed by end sealing mechanism 260 with a curve, the seal regions in the horizontal direction sealed by bottom sealing mechanism 230 and by top sealing mechanism 240 become the largest at the portion to be additionally heat sealed by end sealing mechanism 260. In other words, in the portion to be heat sealed by end sealing mechanism 260, the region heat sealed in advance (region in which films are already heat bonded with each other) is increased. Because of this, when film 101 heat sealed by end sealing mechanism 260 is held between heater bar 267 and heater bar receiver 264, wrinkles are hardly produced in film 101. Therefore, defective sealing due to wrinkles in film 101 can be prevented.

Now, in the manufacturing step of standing pouch 2000 produced by the forming, filling and sealing machine according to the present embodiment, the vicinity of the portion heat sealed by bottom sealing mechanism 230 has a thickness greater than other portions because film 101 is formed quadruplicate in that portion. Therefore, if film 101 is pressed by squeezing rollers 114 in this state, a wrinkle is produced in the film, sometimes causing the heat sealing of inferior quality, which affects the performance of end sealing mechanism 260.

Figure 33:
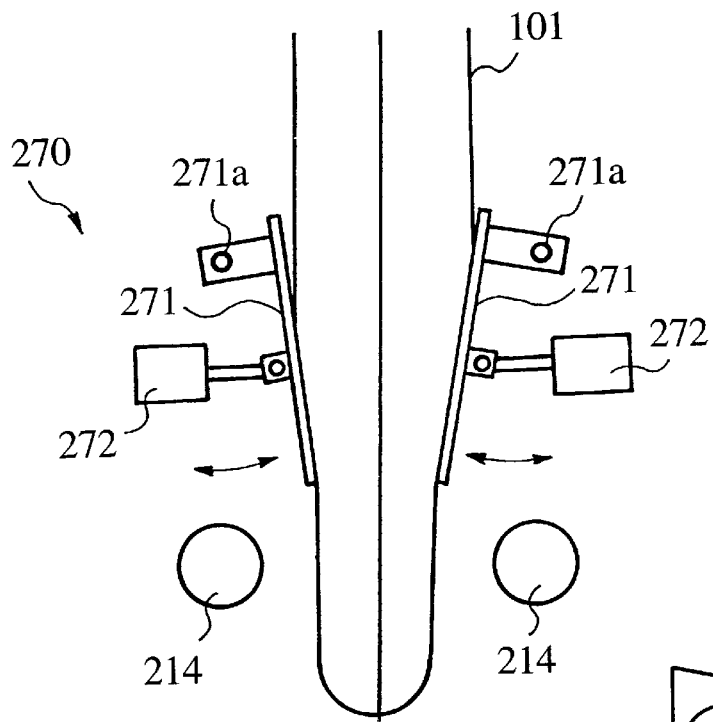
FIG. 33 is a side view of a provisional checking mechanism applicable to the forming, filling and sealing machine of the present invention.

Therefore, in order to prevent wrinkle generation in film 101 when the film is pressed by squeezing rollers 214, provisional checking mechanism 270 may be provided as shown in FIG. 33.

Provisional checking mechanism 270 is provided directly above squeezing rollers 214, being oppositely disposed with film 101 interposing, comprising two provisional check plates 271 journaled so as to be rotatable in the direction of an arrow shown in the figure centered on support shaft 271a which is parallel to the axial direction of squeezing rollers 214, and cylinder 272 for relatively moving each check plate 271 in the direction of the arrow shown. Provisional check plate 271 serves for controlling the thickness of film 101, which contains filling materials, by pressing the film from outside. Before squeezing rollers 214 are closed, provisional check plates 271 are closed to the extent that film 101 is not completely crushed. Through the above process, thickness of film 101 in which filling materials are contained becomes thin and almost uniform in the width direction (horizontal direction) of film 101, and accordingly wrinkles are hardly produced in film 101 even if film 101 is pressed by squeezing rollers 214. Thus controlling the thickness of film 101 by means of provisional check plates 271, and by forming an unfilled portion in film 101 by rotating squeezing rollers 214, wrinkles generation while carrying film 101 can be prevented.

While preferred embodiments of the present invention have been described using specific terms, such description is for illustrative purposes only, and it is to be understood that changes and variations may be made without departing from -the spirit or scope of the following claims.

What is claimed is:

1. A forming, filling and sealing machine comprising:

a first sealing mechanism for heat sealing a long sheet film carried downward with both side ends thereof overlapped with each other, said first sealing mechanism heat sealing said overlapped both side ends along the longitudinal direction of said film;

a folding mechanism for forming two ridge portions in said film by inwardly folding the width direction center part of said long sheet film along the longitudinal direction of said film, the two ridge portions having tops, respectively;

a second sealing mechanism for heat sealing at least the tops of the two ridge portions along the longitudinal direction of said film, the two ridge portions being formed in said film by means of said folding mechanism;

an injection pipe perpendicularly provided for injecting filling material into the film heat sealed by said first sealing mechanism and said second sealing mechanism, said injection pipe being enclosed at the circumference thereof by said film; and a third sealing mechanism disposed below said injection pipe for heat sealing said film horizontally and cutting off the heat sealed portion.

2. A forming, filling and sealing machine according to claim 1, wherein said third sealing mechanism comprises: a heater bar for heat sealing said film and a cutter holding member for holding the cutter for cutting said film, said heater bar and cutter holding member being reciprocally movable facing each other with said film disposed therebetween; wherein said cutter holding member includes a heater bar receiving member which confronts said heater bar when said cutter holding member moves away from said film; and said heater bar is provided with a cooling bar for cooling the portion heat sealed by said heater bar, said cooling bar confronts said cutter holding member when said heater bar moves away from said film.

3. A forming, filling and sealing machine according to claim 1, wherein said second sealing mechanism is provided with bumps for spot heat sealing, the vicinity of the portion of the two ridge portions heat sealed by said third sealing mechanism, the two ridge portions being formed in said film by means of said folding mechanism.

4. A forming, filling and sealing machine according to claim 1, wherein said folding mechanism comprises a push plate for pushing in from outside the film surrounding said injection pipe, and two check plates disposed on both sides of said push plate for controlling the position of said film from the inside of said film.

5. A forming, filling and sealing machine according to claim 4, wherein said check plates are disposed inclined to each other so that the space between them gradually decreases from the upper side to the lower side.

6. A forming, filling and sealing machine according to claim 5, wherein above said check plates, a width regulation plate is provided parallel to said injection pipe for forming in said film a fold which becomes the top of said two ridge portions, said width regulation plate having a width equal to the space between said check plates at the top of said check plates.

7. A forming, filling and sealing machine according to claim 6, wherein above said width regulation plate, a trapezoid plate is obliquely disposed so that said film passes the upper surface downward, the width of bottom side of said trapezoid plate is equal to the width of said width regulation plate, the width of top side of said trapezoid plate is greater than the width of said film and having two oblique sides upwardly extending with equal angles.

8. A forming, filling and sealing machine according to claim 1, wherein said second sealing mechanism comprises a receiving plate disposed between the two ridge portions formed by said folding mechanism; and two seal bars oppositely disposed on both sides of said receiving plate placing said two ridge portions therebetween, said seal bars being capable of pressing said receiving plate with respective pressure surfaces thereof, said pressure surfaces each including a convex and a concave being surrounded by said convex.

9. A forming, filling and sealing machine according to claim 8, wherein the convex of said seal bar is provided at the position where the convex does not press the top region of the fold of said ridge portions in the film disposed between said seal bar and said receiving plate.

10. A forming, filling and sealing machine according to claim 1, wherein a pair of squeezing rollers are provided opposite to each other and reciprocally movable with the film heat sealed by said first sealing mechanism and second sealing mechanism.

11. A forming, filling and sealing machine according to claim 10, wherein above said squeezing rollers, provisional check plates are provided for controlling the thickness of the film heat sealed by said first and second sealing mechanisms and containing filling materials already supplied from said injection pipe.

* * * * *